US006643262B1

(12) United States Patent
Larsson et al.

(10) Patent No.: US 6,643,262 B1
(45) Date of Patent: Nov. 4, 2003

(54) SYSTEM AND METHOD FOR DYNAMIC SHARING OF CONNECTION RESOURCES

(75) Inventors: Tony Ingemar Larsson, Stockholm (SE); Sef Tarik Ale Hammam, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 08/924,708

(22) Filed: Aug. 29, 1997

(51) Int. Cl.$^7$ .................................................. H04J 3/12
(52) U.S. Cl. ........................ 370/236; 370/433; 370/250; 370/522; 370/384
(58) Field of Search ................................ 370/433, 229, 370/230, 231, 232, 235, 236, 250, 522, 524, 357, 360, 384, 248; 340/825.06, 825.16

(56) References Cited

U.S. PATENT DOCUMENTS

| | | | | |
|---|---|---|---|---|
| 4,970,506 A | * | 11/1990 | Sakaida et al. | 340/825.14 |
| 5,124,943 A | * | 6/1992 | Lubarsky | 709/233 |
| 5,230,078 A | * | 7/1993 | Varela et al. | 455/67.1 |
| 5,359,594 A | * | 10/1994 | Gould et al. | 370/276 |
| 5,572,525 A | * | 11/1996 | Shen et al. | 370/257 |
| 5,821,995 A | * | 10/1998 | Nisikawa | 348/212 |
| 5,822,304 A | * | 10/1998 | Brody et al. | 370/248 |
| 5,912,894 A | * | 6/1999 | Duault et al. | 370/433 |
| 5,930,334 A | * | 7/1999 | Lundberg et al. | 379/27 |
| 5,933,077 A | * | 8/1999 | Vogt et al. | 340/506 |

FOREIGN PATENT DOCUMENTS

| | | |
|---|---|---|
| EP | 0 605 349 A2 | 12/1993 |
| EP | 0 714 195 A1 | 11/1995 |
| WO | WO 98/17079 | 4/1998 |

OTHER PUBLICATIONS

*Short Hold Mode in ISDN*, IBM Technical Disclosure Bulletin, vol. 32, No. 10A, Mar. 1990, p. 47–49.
Tao & Martinez, *Internet Access via Baseband and Broadband ISDN Gateways*, IEEE, 1994, p. 485–490.

* cited by examiner

*Primary Examiner*—Hassan Kizou
*Assistant Examiner*—Mitchell Slavitt
(74) *Attorney, Agent, or Firm*—Jenkens & Gilchrist

(57) ABSTRACT

A system and method for the efficient utilization of core telecommunications resources (including both switching and transport resources) during a datacom session over a connection-oriented telecommunications system is described. First, the telecommunications resources along a connection path are partitioned into two or more segments. One or more pause sensors placed along the connection path detect periods of inactivity in an connection. Whenever such a period of inactivity is detected, the pause sensor selectively causes the release of core telecommunications resources for reallocation to active applications, typically by deactivating one or more segments. When wake-up sensors detect renewed activity over the connection, then the dormant connection is reactivated by reallocating core physical resources. The dynamic connection technique of the present invention can be used both with analog (inband) signaling systems (e.g., Plain Old Telephone Service) as well as with digital signaling systems (e.g., Integrated Services Digital Network). The deactivation and reactivation of core telecommunications resources can be performed using various priority schemes.

110 Claims, 14 Drawing Sheets

SYSTEM AND METHOD FOR DYNAMIC SHARING OF CONNECTION RESOURCES

TECHNICAL FIELD OF THE INVENTION

The invention relates to the management of connection-oriented telecommunications systems, and more particularly, to a technique for reusing core telecommunications system resources during periods of inactivity of a connection that does not bring with it a concomitant need for re-origination of the call when the connection is no longer dormant.

DESCRIPTION OF RELATED ART

The demand for telecommunications services has been growing at an ever-increasing rate. One of the factors behind this increasing demand for telecommunications services has been the growing popularity of online data communications ("datacom") services such as those based on the Internet. In order to meet this demand, telecommunications network operators and suppliers have had to continuously upgrade the traffic carrying capacity of both their circuits as well as of the switch nodes interconnecting those circuits.

It has been observed that the demand for ordinary voice telephone service is becoming a decreasingly smaller part of the overall traffic demand in comparison to other telecommunications services such as data communications between computers, graphical image transmissions, video-conferencing and similar broadband services.

Current and future telecommunications subscribers, both residential and business, are likely to be connected, via common accesses, to a web of broadband networks operating at data rates of 150 megabits per second or above and which can support a wide range of different types of broadband services. Broadband networks may be generally defined as those which support user services requiring bit transfer rates substantially in excess of one megabit per second.

In general, broadband networks are likely to be built using Asynchronous Transfer Mode (ATM) technology as the underlying type of transport and switching technology. Broadband Integrated Services Digital Networks (B-JSDN), employing ATM technology can offer users the flexibility and capacity necessary to support diverse telecommunications services ranging from basic voice telephone service to high speed data transfer, video telephony, and high-quality television signal distribution. As would be obvious to those of ordinary skill in the art, ATM technology relies upon the compartmentalization of data into packets or cells which are transmitted and switched as individual units through the various nodes of a broadband network.

Current large telephone central offices may serve up to 100,000 customers. Based upon such a large number of terminals, a future B-ISDN central office may be required to operate at a switching capacity of around one terabit per second ($10^{12}$ bits per second) or greater. Assuming that each customer is served with a B-ISDN line operating at the design throughput level of 155.52 megabits per second (the STM-1 rate), an ATM exchange switch needs to be able to handle a peak throughput in excess of 15 terabits per second. However, in practice, the average throughput (i.e. the bandwidth utilization rate) is likely to be substantially lower than 15 terabits per second due to the inherent burstiness of datacom traffic on many levels.

Telecommunications equipment capable of handling high switching rates are expensive. consequently, it is desirable that such equipment be utilized as much as possible. Since the average additional revenue that may be realized by improving the utilization rate of the telecommunications equipment is higher at the core than at the periphery, there is a strong incentive for seeking increased efficiency in using core telecommunications resources.

For the purposes of the present patent application, the core telecommunications resources principally refer to the switching and transport resources that are located between and within a local exchange and a remote subscriber station (or more generally between network adaptors and a terminal) Under the traditional design paradigm for telecommunications systems, such core resources can be ordinarily be easily reallocated to other users or applications provided that transmission activity on a circuit-switched telephony connection can be monitored to detect periods of quiescence.

In the current era of explosive growth in data traffic due to the Internet, lots of subscribers use their personal computers to access the Internet via dial-up connections through their Internet Service Provider (ISP). In most regions of the United States of America, ISPs can be dialed as local calls. consequently, most users do not incur toll charges from their local telephone company in accessing their ISP.

Furthermore, most ISPs offer fixed-price access to the Internet. Thus, most users do not pay hourly charges for accessing the Internet. These factors have led to a vast increase in the data traffic on the telephone network. Thus, the unlimited simple and fixed price access to the Internet and other similar online services has led to a problem, colloquially referred to as the problem of "modem camping."

In brief, the "modem camping" problem arises when a subscriber accessing an on-line services through a modem uses the available bandwidth of the transmission channel only sporadically. This results in an entire end-to-end circuit-switched telephony connection being rendered unavailable to other (more active) users.

It would be especially useful if an inactive data communication session could release the connection resources (both switching and transport) for use by others. As explained earlier, it would be best to start on this task by detecting and releasing core telecommunications resources that have been allotted to currently inactive connections.

Unlike voice traffic, data communications ("datacom") traffic is inherently "bursty". This means that the average traffic on a datacom link may be significantly different from the instantaneous traffic on the link. Furthermore, interactive computer applications typically generate discontinuous traffic patterns having long periods of inactivity.

For example, a user browsing the Internet may download an image from a remote web site. The telephone connection between the subscriber and the subscriber's Internet Service Provider (ISP) will on average be heavily loaded every time a graphical image file is accessed or downloaded by the subscriber. However, such periods of heavy utilization of the telephone connection are likely to be interspersed with extended periods of little or no activity.

The amount of time that a connection remains dormant has been found to depend upon many factors such as user behavior, the computer algorithms used and the sizes of the buffers in the various processors along the route. The use of circuit-switched telephony connections for handling datacom traffic is likely to result in the wastage of connection resources (including both switching and transport resources). This is because circuit-switched telephony connections traditionally provide an invariant connection resource (in terms of both switching and transport resources) between the two end points of the circuit. Consequently, all resources allocated to the telephony circuit remain blocked even during long periods of inactivity.

Recent attempts to reduce the wastage of connection resources within circuit-switched data communication links have focused on using "on-demand" dial-up connections that repeatedly dial-up and reestablish an end-to-end connection upon the detection of renewed activity. Simultaneously, the end-to-end session is kept active ("alive") even during periods of inactivity.

This technique for increasing the utilization efficiency of intermediate link resources requires a dialed-up connections be reestablished several times during a single session. consequently, the current technique involves repetitive signaling, processing and resource-handling and imposes additional demands on the signaling and management subsystems of the telecommunications network.

Establishing a dialed-up connection consumes control system resources (e.g., signaling and processing resources) each time a new connection is established or reestablished. The set-up processing of a dialed-up connection is rarely instantaneous and hence results in additional transmission delays and a concomitantly wastage of processing resources. This is because telephone numbers, user authenticity, access rights, user service profile (and sometimes) routing and charging issues need to be analyzed anew every time a new call is made.

Part of the additional costs of using the repeated dial-up technique also follows from the fact that call-related information structures and charging records need to be built up anew for each re-dialed connection. The use of the repeated dial-up technique to improve the utilization of connection resources invariably causes the signaling and processing costs of each dial-up to be incurred multiple times during a single session. This results in a substantial increase in the signaling and processing costs on a per-session basis.

It would therefore be desirable to have a technique for utilizing scarce call and connection resources (including switch, transport, signaling and processing resources) in an efficient manner that permits a datacom application to use a circuit-switched telephony connection on demand in a dynamic application controlled manner without requiring a call to be reestablished periodically by re-dialing.

It would be desirable if connection set-up resources such as key code receivers, tone generators and processors were invoked and used only once for each session of a datacom application. Additionally, it is desirable if the slow connection-establishment times associated with the current repeated dial-up technique is speeded up by eliminating or replacing the transmission and analysis of multiple B-numbers with a faster and simpler wake-up signal. The use of a wake-up alert can lead to higher resource utilization and reduced processing load on core telecommunications resources.

It would be desirable if some or all of the connection resources that are not being used during a datacom session were released and made available for use by other active datacom sessions or voice-connections. Such an enhancement to the art could enable the sharing (and increase the utilization) of connection resources. This can prove especially useful to increase the speed and reduce the cost of providing new data access services.

It has also been found desirable to have the access routers serving a datacom access gateway to be centralized and compatible with multiplexing techniques such as time-sharing. It has additionally been found desirable to provide secure and low-cost connection to Internet Service Providers (ISPs), to facilitate telecommuting and to provide enterprise-wide access to networks and services. It would also be desirable if a solution to the problem of modem-camping were made compatible with emerging applications such as electronic commerce.

There has been a long-felt need for low-cost and secure telephony-based connection that can also permit data communication between multiple peer personal computers (PCS), and facilitate the agglomeration of small Local Area Networks (LANs) into a Wide Area Network and the creation of Virtual LANs (VLANs).

SUMMARY OF THE INVENTION

It is therefore a primary object of this invention to permit a datacom application to use a circuit-switched telephony connection on demand without requiring repeated dial-ups. It is an additional object of the present invention to permit a datacom application to dynamically reactivate a circuit-switched telephony connection.

Yet another object of the present invention is to permit a datacom application program to control the invocation and release of a circuit-switched telephony connection. It is an additional object of the subject invention to permit the release of core telecommunications resources during periods of inactivity in a data communication session.

It is an additional object of the present invention to permit adaptive disconnection and/or reactivation of physical resources based upon the overall load on the system at any given time. It has been found desirable to avoid the release of telecommunications resources whenever the overall load on (or resource utilization rate of) a telecommunications system is low. Another object of the present invention is to permit the allocation and reestablishment of connection resources to be controlled by priority levels assigned to subscribers based upon the intended use and/or contractual subscription arrangements.

It is also an object of the present invention to permit data structures associated with a specific circuit-switched telephony connection to be maintained even while some or all of the core connection resources have been (temporarily) released and reutilized.

In one aspect, the dynamic connection system and method of the present invention increases the efficiency of utilization of core telecommunications resources by a data communications ("datacom") application program operating on a connection-oriented telecommunications network. The dynamic connection technique reallocates system resources on the most valuable segment of an end-to-end connection between an origination point and a termination point. The dynamic connection technique is amenable to dynamic control by the datacom application program.

The technique is enabled by first partitioning an end-to-end connection into two or more segments. At least one, a first, of the segments should contain core telecommunications resources associated with the end-to-end connection. Transmissions over the end-to-end connection are continuously monitored till a period of quiescence is detected on the connection for a preselected period of time.

When such a period of inactivity is detected, the first segment of the connection is deactivated (i.e. put into a paused state). The core telecommunications resources associated with the deactivated first segment are released for reuse by other, active applications, causing the end-to-end connection to become dormant.

Transmission activity or attempts in segments other than then first segment of the end-to-end connection is then monitored till renewed transmission activity is detected in a segment other than the now deactivated first segment. Upon F the detection of such renewed activity, the dormant end-to-end connection is reactivated subject to resource and other system constraints.

The dynamic connection technique of the present invention can be used with both analog (inband) signaling systems (e.g., Plain Old Telephone Service or POTS) as well as with digital signaling systems (e.g., Integrated Services Digital Network or ISDN). The deactivation and reactivation of core telecommunications resources can be performed using various priority schemes.

BRIEF DESCRIPTION OF THE DRAWINGS

A more complete understanding of the method and system of the present invention may be obtained by reference to the detailed description of the preferred embodiments that follows, taken in conjunction with the accompanying drawings, wherein.

DESCRIPTION OF THE PREFERRED EMBODIMENT

Telecommunications Networks

Figure 1:
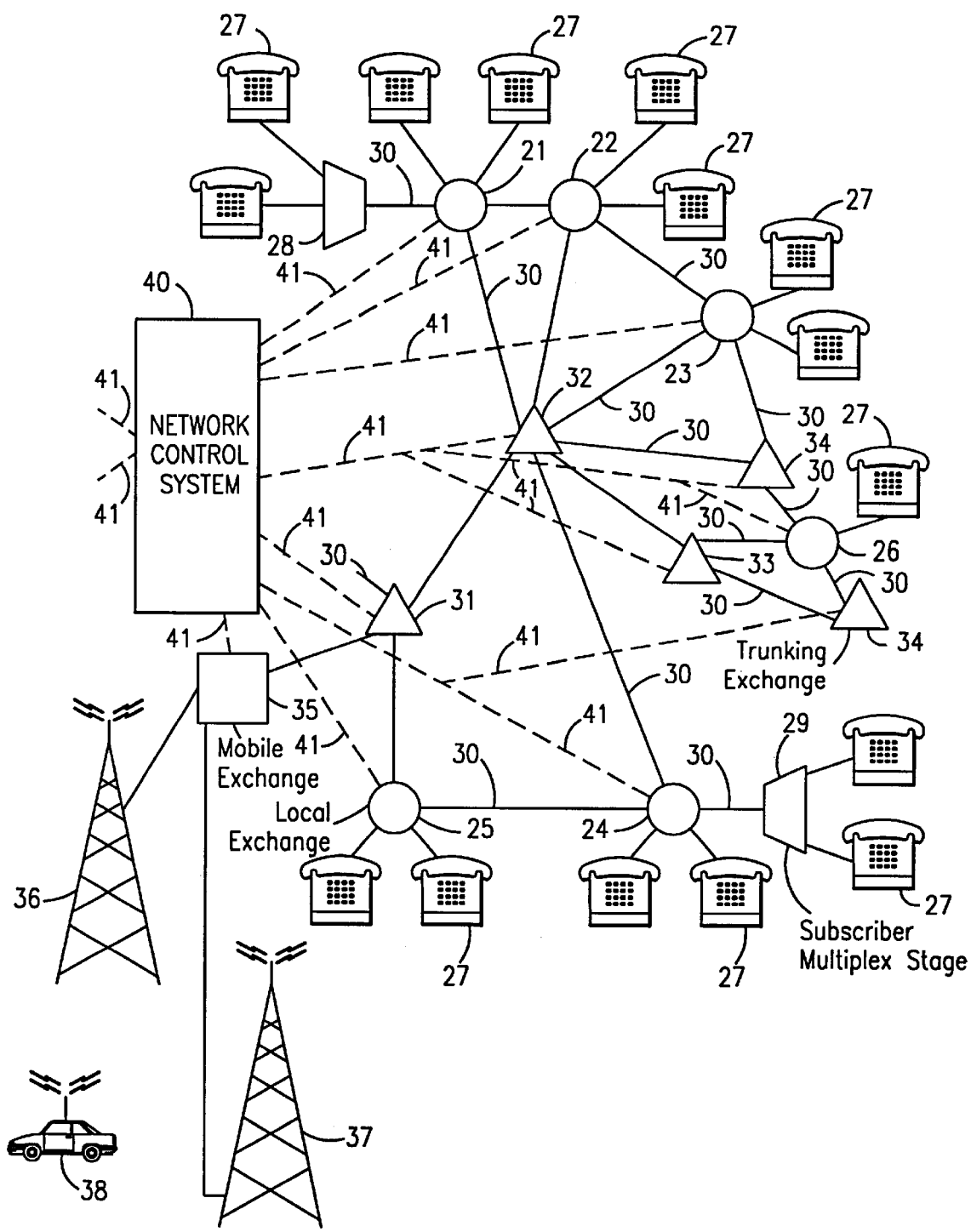
FIG. 1 is a block diagram of an illustrative telecommunications network within which the dynamic connection system and method of the present invention may be employed.

Referring first to FIG. 1, there is shown an illustrative schematic diagram of a conventional public telecommunications network including a plurality of local exchanges 21 to 26, each of which have a plurality of local subscribers connected thereto and represented by telephone instruments 27. Two of the local exchanges 21 and 24 are represented as having remote subscriber multiplex stages 28 and 29 associated therewith which, in turn, have local customers 27 connected thereto.

The network of FIG. 1 also includes a plurality of trunking exchanges 31 to 34 which serve primarily to interconnect various local exchanges with one another and to provide routes between various parts of the network. Trunk exchange 31 is shown connected to a mobile exchange 35 which includes a pair of illustrative base stations 36 and 37 serving a plurality of mobile radio telephone subscribers represented at 38.

In addition, other telecommunications services such as databases and intelligent networks may also be connected to various ones of the exchanges shown. Between each of the exchanges 21 to 35 in the network, there are shown a plurality of communication paths 30, each of which may further comprise a plurality of communication circuits, including cables, optical links or radio links for carrying voice and/or data communication between the various exchanges within the network.

The network of FIG. 1 also includes a network control system 40 which is connected to each of the exchanges 21 to 35 within the network by means of communication links 41 (represented by dotted lines) for the transmission of control signals to each exchange and for the reception of traffic data from each exchange. The network control system 40 issues commands to dynamically reconfigure the communication paths within the various traffic routes of the network as well as to control the alarm systems within the exchanges of the network in order to fine tune the utilization of connection resources (both switching and transport) within the network.

The "modem camping" problem discussed earlier can be ameliorated somewhat if at least the core telecommunications resources associated with an inactive circuit-switched telephony connection were released and made available for use by active datacom sessions or voice connections. Prior to describing the details of implementation of the system and method of the present invention, it would be useful to provide an overview of a typical and wholly exemplary telecommunications system within which the system and method of the present invention is implemented, such as the Ericsson AXE-10 telecommunications system.

AXE-10 System Concepts

As discussed earlier, numerous changes are currently taking place within public telecommunications transport networks. Operators of public telecommunications networks have long sought to deploy a single type of technology to efficiently handle the transport and switching of all types of telecommunications services.

Figure 2:
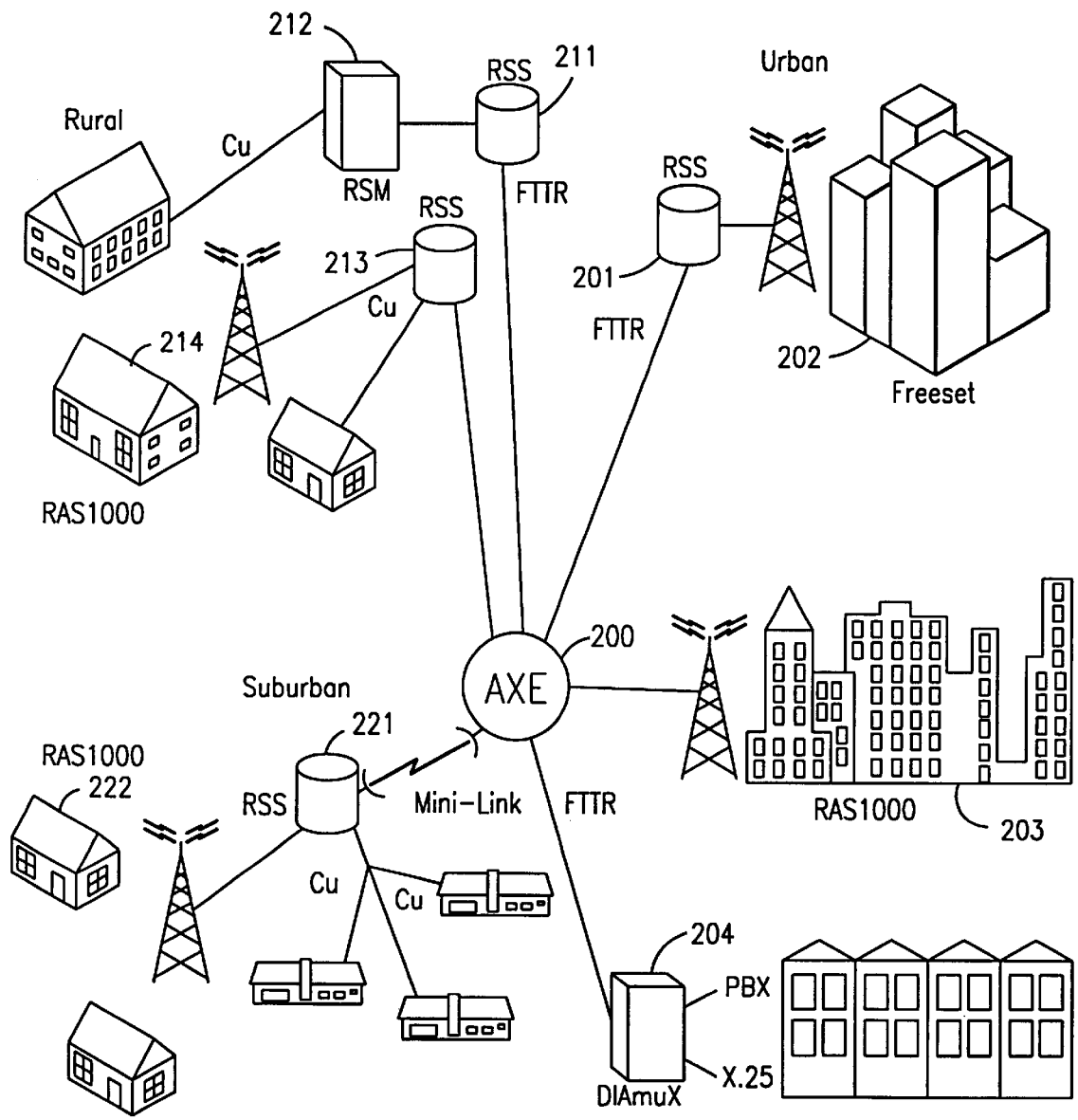
FIG. 2 is an overview block diagram showing various components of an exemplary Ericsson AXE telecommunications network.

FIG. 2 is an overview block diagram showing the various components of an AXE telecommunications system. An AXE telecommunications system includes an AXE-10 telephone exchange that is a versatile unit capable of serving urban, rural and suburban areas both interchangeably and scalably.

Thus an AXE Exchange 200 can be connected via a fiber-optic link (ETTR) to a Remote Subscriber Switch (RSS) 201 in a suburban area that is connected by antennae to various Freesets 202. An AXE Exchange 200 may also be linked directly to an RAS1000 unit 203 providing mobile telephony service to cellular telephony networks serving an urban geographic area. The AXE Exchange 200 may also be linked through a fiber-optic link to a Digital Analog Multiplexer (DIAmuX) unit 204 that in turn may be connected by a Private Automatic Branch Exchange (PABX) or X.25 link to urban subscribers.

The AXE Exchange 200 may also be connected via a fiber-optic link to a Remote Subscriber Switch 211 that in turn may be connected to a Remote Subscriber Multiplexer 212 serving rural subscribers via (copper) twisted-pairs. Rural subscribers may also be served via an RLL (Radio in the Local Loop) system based upon an RAS1000 unit 214. As shown in FIG. 2, the AXE Exchange 200 in such a case is first connected to a Remote Subscriber Switch 213 and thence by copper (CU) twisted-pairs to either the antenna of an RAS1000 unit 214 or directly via twisted-pairs to various rural subscribers.

An AXE-10 telecommunications exchange can also serve suburban subscribers through a Mini-Link connection to a Remote Subscriber Switch 221. The Remote Subscriber Switch 221, in turn, is connected directly by twisted-pairs or via a RAS1000 unit 222 to various suburban mobile telephone users.

A Radio in the Local Loop (RLL) system may be based upon the cellular radio technology of the Ericsson RAS1000 Radio Access System and can provide a radio-based connection for fixed (or relatively-immobile) subscribers. The principal advantage of an RLL system is that it offers a fast and flexible way of connecting new subscribers in urban and rural areas and replacing wired connections with wireless local.

The Freeset cordless telephony system 202 provides cordless extensions to PABX subscribers. The Freeset system uses radio technology that allows calls to be made or received within the coverage area of the system. The DIAmuX flexible access system 204 shown in FIG. 2 is a multiplexer that provides business subscribers with a single access point for a variety of high-capacity telecommunications links, e.g., PSTN, ISDN, analog leased lines, 2.048 Mbits/sec. PCM links, nx64 Kbits/sec. and V.11 & V.24 data links.

Figure 3:
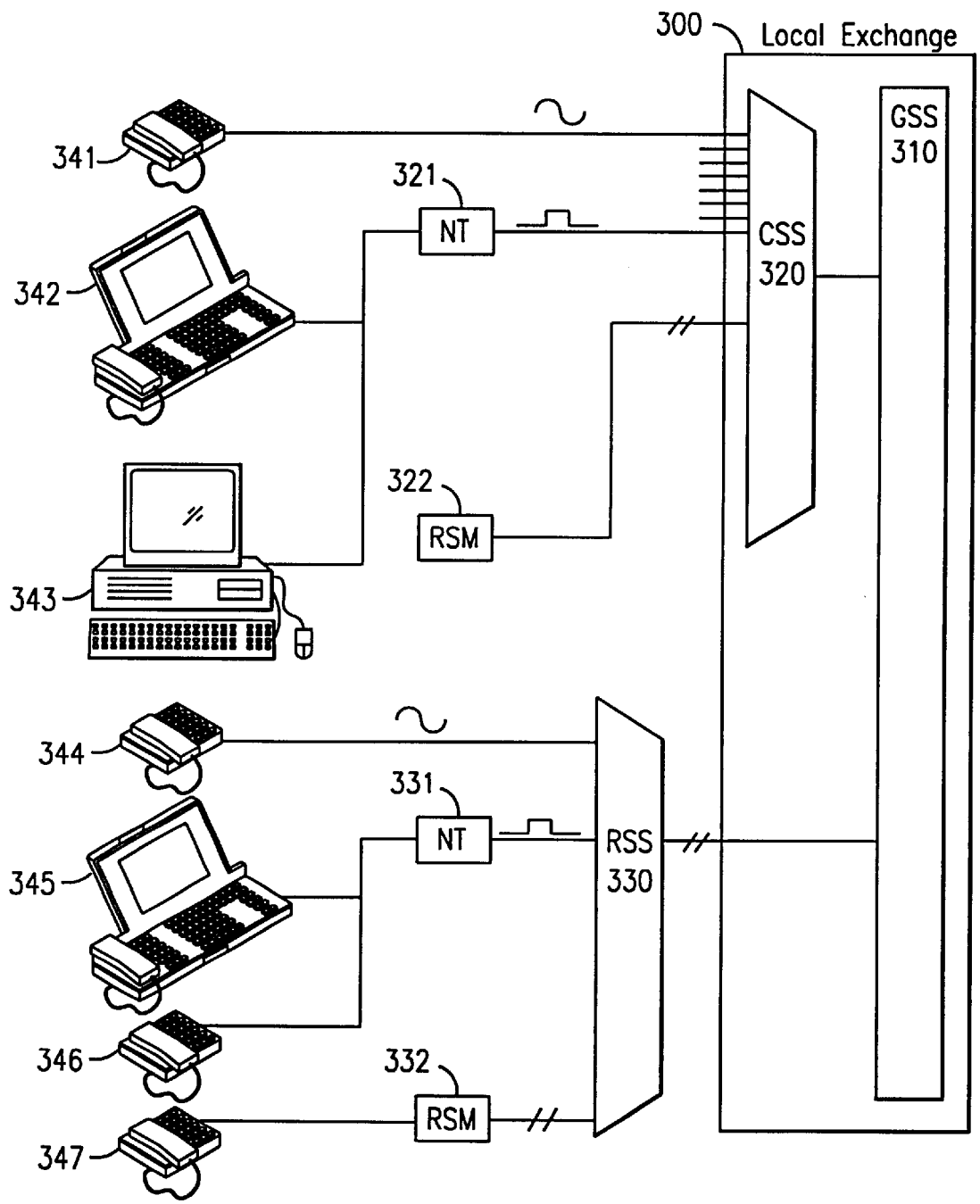
FIG. 3 shows some of the components of an AXE-10 based system including a Central Subscriber Switch (CSS), a Remote Subscriber Switch (RSS) and a Remote Subscriber Multiplexer (RSM)

FIG. 3 shows some of the critical components of an AXE-based system including a Central Subscriber Switch (CSS) 320, a Remote Subscriber Switch (RSS) 330 and Remote Subscriber Multiplexers (RSMs) 322 and 332. An AXE local exchange 300 comprises a Group Switching Subsystem (GSS) 310 that is connected to one or more Central Subscriber Switches (CSS) 320 and Remote Subscriber Switches (RSSs) 330.

In the exemplary illustration of FIG. 3, only one CSS 320 and one RSS 330 unit have been shown. However, it should be emphasized that the design of the AXE-switching system is modular and hence permits the addition of extra CSS and/or RSS units as needed. Terminologically, an RSS or a group of RSSs that are collocated at a particular physical location are also referred to as Remote Switching Units (RSUs).

The central switching part of the AXE system is the Group Switching Subsystem (GSS) 310. The Group Switch sets-up, supervises and clears connections between telecommunications terminals such as phones, etc. Subscriber lines are not connected directly to the GSS, but are instead connected to the Subscriber Switching Subsystem (SSS), not shown in FIG. 3. An SSS concentrates the traffic from several lines over a Pulse Code Modulated (PCM) link to the GSS 310.

The SSS may be located in an AXE local exchange 300 close to the GSS 310, e.g., within the same physical building as the local exchange equipment. In such a case the SSS is referred to as a Central Subscriber Switch (CSS) 320. Alternatively, the SSS can be deployed as a remote access node, which is typically at some physical distance from the AXE local exchange 300. In such a case, the SSS is referred to as a Remote Subscriber Switch (RSS) 330.

The Remote Subscriber Multiplexer (RSM) is an add-on subscriber access node used in an access network that can cater to small groups of subscribers. It is designed to provide both mobile as well as standard telephony connections. The modular building blocks of the AXE system, comprising the CSS, the RSS and the RSM, enable network operators to deploy subscriber access equipment that optimize network efficiency.

The CSS 320 shown in FIG. 3 can have both digital as well as analog subscriber lines connected to it. Digital subscriber lines are terminated at the subscriber's premises using a Network Terminal (NT) 321. When a subscriber attempts to place a call to another subscriber who is connected to a common CSS unit, the connection can be switched either within the CSS 320 or through the GSS 310. On the other hand, when a subscriber attempts to place a call to a subscriber connected to another exchange, the call is switched by the GSS 310. Thus, a CSS 320 can be directly connected to both analog telephone equipment 341 as well as to digital telephone equipment 342 and/or a personal computer 343, via a Network Terminal 321 as explained above.

The RSS 330 is an integral part of an AXE local exchange 300 in all respects except its physical location. Although it is physically separate from the AXE local exchange 300, RSS 330 remains under the complete control of the AXE local exchange. The RSS 330 brings all of the functions and services of the AXE system closer to a subscriber or group of subscribers. Calls between two subscribers who are connected to the same RSS unit 330 can be switched either within the RSS or through the GSS 310 in the associated AXE Local Exchange 300. On the other hand, calls between subscribers connected to different exchanges are switched through the GSS 310 of the AXE local exchange 300.

The digital network can be cost-effectively extended to small groups (of up to 60 or so) urban or rural subscribers using an RSM unit. The RSM multiplexes traffic to the RSS or the CSS but does not carry out any traffic switching functions. As shown in FIG. 3, RSM units may be connected to either or both of the CSS 320 and/or the RSS 330. One or more telephone handsets 347 may be connected to an RSM 332 and thence via an RSS 330 to the GSS 310.

Figure 4:
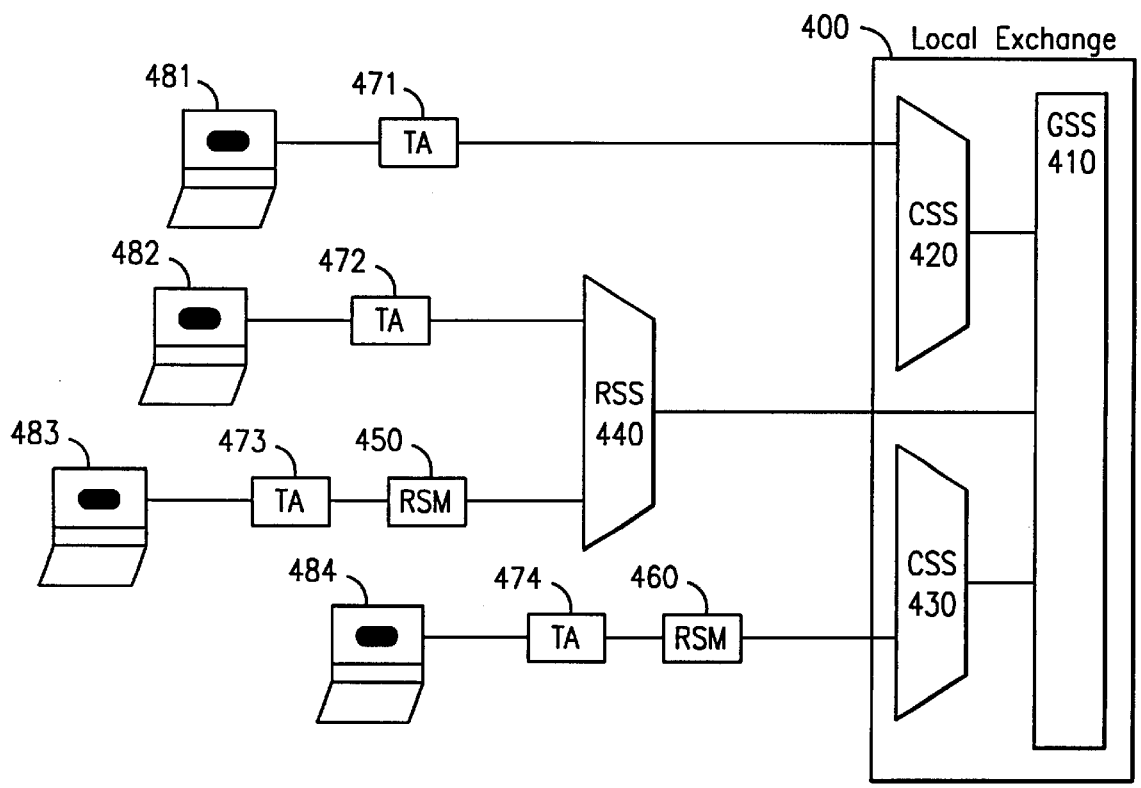
FIG. 4 shows several Subscriber Terminal Adaptors of the present invention integrated with certain components of an AXE system.

FIG. 4 shows several Subscriber Terminal Adaptors of the present invention integrated with certain components of an exemplary AXE system. As shown in FIG. 4, an AXE local exchange 400 comprises a GSS unit 410, one or more CSS units 420 & 430 and one or more RSS units 440. A data terminal or personal computer 481 can be connected directly to the CSS 420 through a terminal adapter 471.

In an alternative integration of the system and method of the present invention with an AXE system such as that shown in FIG. 3, a data terminal 482 may be connected through a terminal adapter 472 to an RSS 440 and thence directly to the GSS 410. In a different integration of the present invention with an AXE system, a data terminal 483 may be connected through a terminal adapter 473 and an RSM 450 to the RSS. 440. As further shown in FIG. 4, a data terminal 484 may also be connected through a terminal adapter 474 to an RSM unit 460 and thence to the GSS 410 via a CSS 430.

Applying the Dynamic Connection Technique

Figure 5:
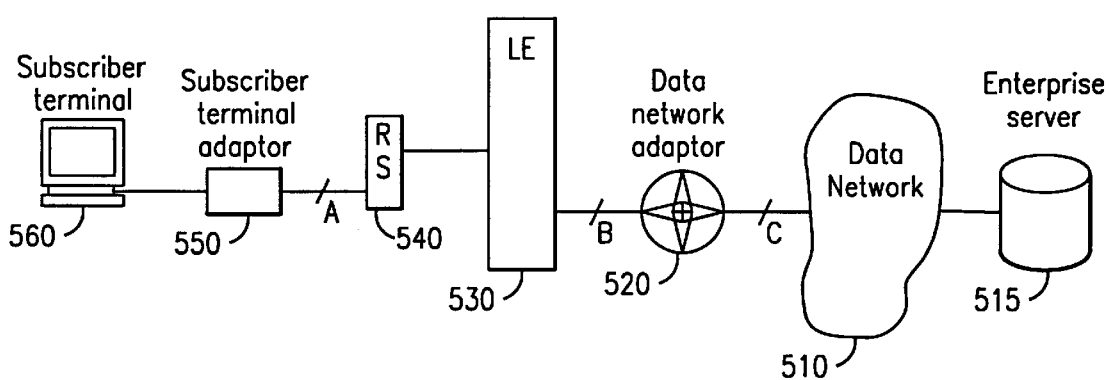
FIG. 5 shows one application of the present invention where a remote subscriber accesses an enterprise server connected to a data network by dialing-up through a telecommunications network.

FIG. 5 shows one application of the present invention where a remote subscriber accesses an enterprise server connected to a data network through a dial-up connection routed over a telecommunications network. A remote subscriber (not shown in FIG. 5) can use a subscriber terminal 560 connected to a Subscriber Terminal Adaptor (TA) 550 to connect to the Remote Switch 540. The Remote Switch 540 is linked to a Local Exchange (LE) 530 by conventional means. The Local Exchange 530 is connected to a Data Network 510 through a Data Network Adaptor (NA) 520 as is understood in the art. An Enterprise Server 515 may additionally be connected to the Data Network 510, as shown in FIG. 5.

As explained in greater detail elsewhere in this specification, the system and method of the present invention focuses on maximizing the utilization of the core telecommunications resources between and within a Remote Switch 540 and a Local Exchange 530. In the preferred embodiment of the present invention, the dynamic connection technique is implemented using pause sensors located in one or more of the Subscriber Terminal Adaptors 550 and/or the Data Network Adaptors 520, and at least two wake-up sensors (also referred to as activity sensors) collocated in both the Subscriber Terminal Adaptors 550 and the Data Network Adaptors 520.

Figure 6:
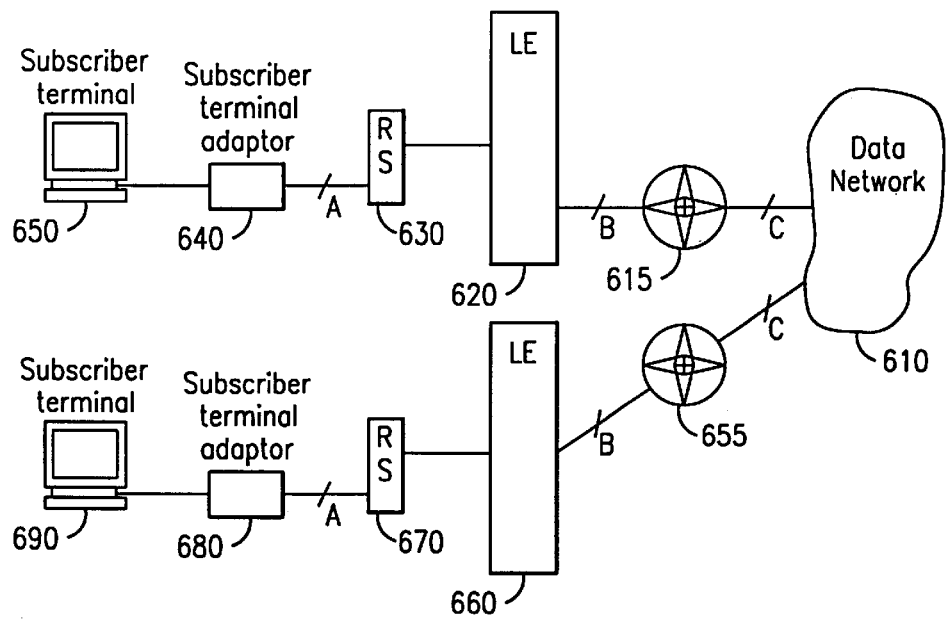
FIG. 6 shows another application of the present invention involving a datacom session between two remote computers that are connected to a common data network through two different dial-in connections.

FIG. 6 shows another application of the present invention involving a datacom session between two remote computers that are connected to a common data network through two different dial-in connections. The system and method of the present invention can be used by two subscribers "A" and "B" to access a Data Network 610. Subscriber A (not shown in FIG. 6) uses a subscriber terminal 650 to connect to the Data Network 610 through a Remote Switch 630 of the Local Exchange 620 using the Subscriber Terminal Adaptor 640. The Local Exchange 620 is connected to the Data Network 610 through a Data Network Adaptor 615, as described hereinbefore.

Subscriber B (also not shown in FIG. 6) accesses the Data Network 610 using the subscriber terminal 690. The subscriber terminal 690 is linked to the Data Network 610 through a second Local Exchange 660 via a second data network adapter 655. The subscriber terminal 690 is connected to a second Remote Switch 670 of the Local Exchange 660 through a second subscriber terminal adapter 680.

Figure 7:
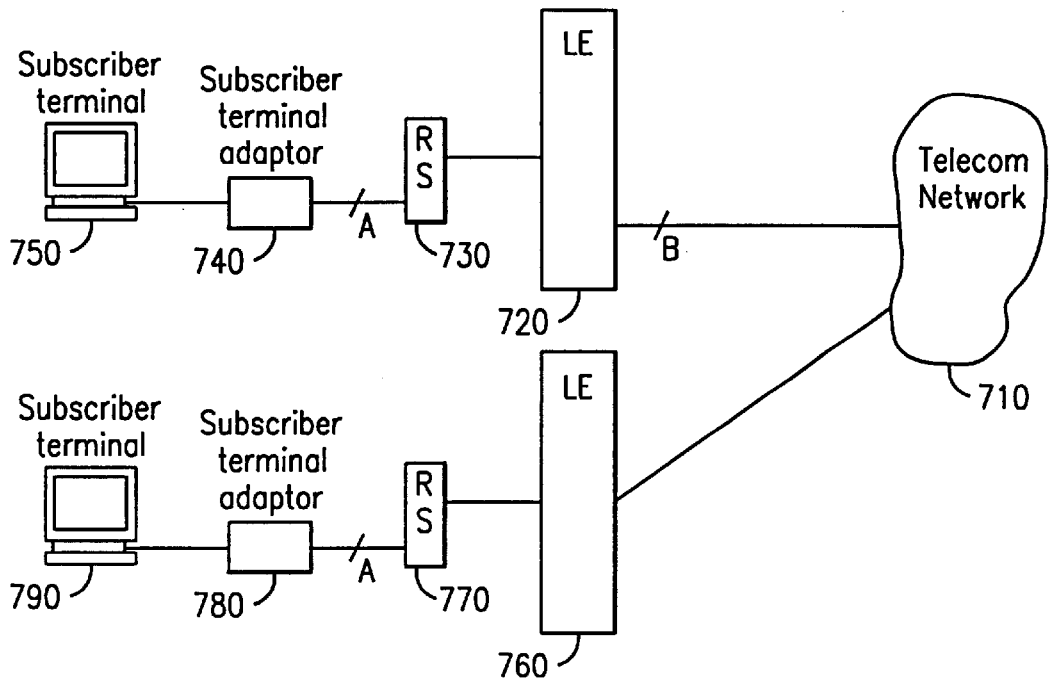
FIG. 7 shows yet another application of the present invention where two subscriber terminals exchange data through a dial-up connection that is routed through a telecommunications network.

FIG. 7 shows yet another application of the present invention where two subscriber terminals 750 & 790 (associated with subscribers "A" or "B" respectively) exchange data through a dial-up connection. Subscriber A uses subscriber terminal 750 to link to subscriber B's subscriber terminal 790 through a PC-to-PC dial-up connection that is routed through a telecommunications network 710. Subscriber terminal 750 is connected via a Subscriber Terminal Adaptor 740 to Remote Switch 730 of Local Exchange 720. Subscriber terminal 790 is connected through a Subscriber Terminal Adaptor 780 to Remote Switch 770 of Local Exchange 760. The Local Exchanges 720 & 760 are interconnected to each other through a telecommunications network 710.

Figure 8:
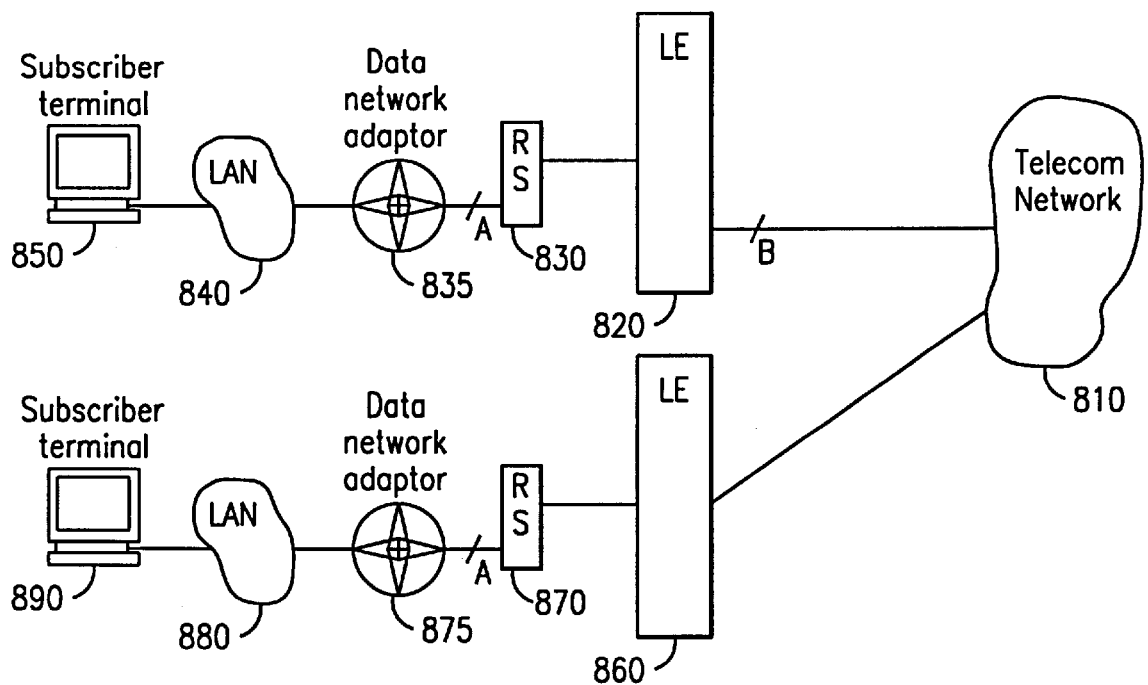
FIG. 8 illustrates another application of the present invention where a wide area network (WAN) is created by interconnecting two or more subscriber terminals belonging to different local area networks through a telecommunications network.

FIG. 8 illustrates another application of the present invention where a Wide Area Network (WAN) is created by interconnecting two or more subscriber terminals 850 & 890 (associated with subscribers "A" or "B" respectively) belonging to different local area networks (LANs) 840 & 880 respectively, through a telecommunications network 810. Subscriber terminal 850 (which is nominally associated with LAN 840) is connected to Remote Switch 830 of Local Exchange 820 through a Data Network Adaptor 835. Likewise, subscriber terminal 890 (which is nominally part of LAN 880) is connected to Remote Switch 870 of Local Exchange 860 through the Data Network Adaptor 875. The Local Exchanges 820 & 860 are interconnected to each other through the telecommunications network 810.

Figure 9:
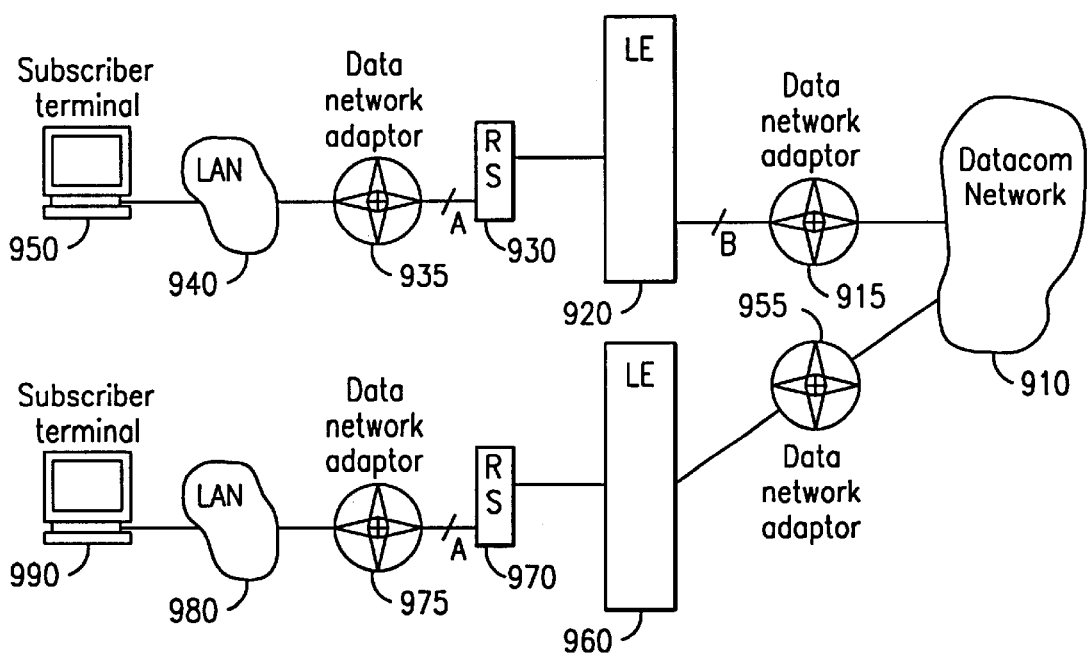
FIG. 9 depicts yet another application of the present invention where a wide area network (WAN) is created by interconnecting two or more subscriber terminals belonging to different local area networks through a datacom network using data network adaptors.

FIG. 9 depicts yet another application of the present invention where a wide area network (WAN) is created by interconnecting two or more subscriber terminals 950 and 990 (associated with subscribers "A" or "B" respectively) belonging to different local area networks 940 and 980 respectively, through a datacom network 910 using data network adaptors 915, 935, 915 and 955 respectively. Subscriber terminal 950 (which is nominally associated with LAN 940) is connected to Remote Switch 930 of Local Exchange 920 through a Data Network Adaptor 935. Likewise, subscriber terminal 990 (which is normally part of LAN 980) is connected to Remote Switch 970 of Local Exchange 960 through the Data Network Adaptor 975. The Local Exchanges 920 & 960 are interconnected to each other through the telecommunications network 910.

Enhancing Functionality with the Pause and Wake-Up Commands

As explained earlier, it has been found desirable to permit a datacom application program to dynamically control a circuit-switched telephony connection without requiring repeated dial-ups. The system and method of the present invention provides such a functionality by introducing two new system-level commands: the pause command and the wake-up command. The addition of these system-level commands permits the creation and maintenance of a dynarnic connection. The conceptual significance of the dynainic connection technique is explained in greater detail below.

During a datacom session between two or more communicating entities that is carried over a telecommunications network, there will often be periods of inactivity due to the inherent "burstiness" of datacom applications. Whenever such a period of inactivity is detected, the system and method of the present invention permits the session as well as the telephone call to be made dormant without bringing the connection to an end. Additionally, the underlying physical connection and transport resources, especially in the core segment of the link (i.e., the segment from the remote subscriber stage towards the local exchange and/or the trunk exchange) are released. This causes the erstwhile active connection to transition to the paused state (also referred to herein as the dormant state).

As explained elsewhere in this specification, it would be easy to extend the system and method of the present invention to also permit the reuse of an inactive local loop. However, it has been found that the greatest scope for revenue enhancement arises from reuse of core telecommunications resources (i.e., resources that are physically closer to the local exchange than to the subscriber). Using the terminology shown in FIG. 2, the core region of the telecommunications network is the segment lying between a Local Exchange and a Remote Subscriber Stage.

As would be well known to one skilled in the art, every telephone call is associated with control and management information such as the calling party number (the A-number), the called party number (the B-number), the authority and charging information acquired during the initial analysis phase of call set-up. In addition, information structures need to be created to manage each connection.

Whenever an erstwhile active connection is temporarily put into a pause state, the dynamic connection technique of the present invention causes the associated numbers, user authority and authenticity, charging data and corresponding information structures to be saved till the dormant connection is later reactivated. Saving the state of the system and the data associated with an active connection during periods of inactivity permits the saved information to be reused upon the reactivation of the connection. In this manner, the dynamic connection technique of the present invention minimize the effort involved in setting up a call and building up corresponding information structures and performs these functions only once per call and/or session.

Whenever renewed data traffic is detected on either side of a dormant connection, it is now no longer necessary to reestablish the connection by re-dialing a completely new telephone call. Instead, the saved data structures associated with the dynamic connection, i.e., the context, can be used to reactivate the dormant connection even while permitting connection resources (including both switching and transport resources) to be temporarily released for reuse during periods of quiescence of the data connection.

In this manner, the dynamic connection technique of the present invention enables repeated physical disconnection and reselection of transport and connection resources during a single datacom session and associates each dynamic connection with a single telephone call by reusing the call information structures created during the original call set-up. Thus, the dynamic connection technique can provide savings in connection resources (including both switching and transport resources) with significantly reduced signaling and processing overheads in a telephone exchange.

In an alternative embodiment of the present invention, the disconnection of physical resources during periods of inactivity in a datacom link can be made adaptive based upon the instantaneous resource loading. If the resource handler detects a lack of physical resources, this can be made to trigger the forced release of resources allocated to dormant dynamic connections. Thus, for example, the detection of inactivity need not result in the disconnection and/or release of physical resources whenever the connection load is low. Thus, whenever very few connection resources are being used processing resources can be saved by not seizing back for reallocation any core telecommunications resources found to be unutilized or underutilized.

In a different embodiment of the present invention, the allocation of connection resources can also be based upon a priority level associated with a specific service or subscriber. This permits different subscribers to be allotted different priorities based upon contractual arrangements with the service provider or based upon normative judgments about the relative priorities of different data streams.

In still another embodiment of the present invention, the charges associated with a subscriber connection vary depending upon whether the connection is active or dormant. For example, the subscriber may contract to maintain an active connection regardless of their modem camping and not deallocate resources during inactive times. Another subscriber, for a reduced fee, may accept the dynamic allocation/deallocation techniques set forth in the present invention. In this manner, a deallocation timer may be associated with such a subscriber to measure the dormancy period and adjust the subscription fee accordingly, e.g., establish a reduced fixed rate, a rate based an a percentage, etc.

In the preferred embodiment of the present invention, periods of inactivity in the data traffic is detected using a packet pause sensor. Technically, a packet pause sensor can be placed anywhere along a circuit-switched telephony connection carrying traffic from a datacom session. In practice, it has been found useful to place the packet pause sensor in the Data Network Adaptor and/or in the Subscriber Terminal Adaptor. However, in some applications the packet pause sensor can also be included as part of the modem driver software placed in the subscriber's personal computer or in the line card at the Remote Subscriber Stage of a telephone exchange.

The sensitivity of the packet pause sensor can be adjusted by including a programmable time delay threshold before the sensor is triggered. After being armed, the packet pause sensor triggers the pause signaling upon sensing inactivity for a programmed period of time. It has been found useful to have the packet pause sensor be collocated with either a Subscriber Terminal Adaptor or a Network Adaptor having direct access to the digital control channel of the telecommunications switch (e.g., via the D-channel of an ISDN line).

Such an arrangement allows a pause signal to be sent directly to the local exchange as a digital control channel message because of the direct linkage of the packet pause sensor to the digital control channel. It can additionally permit a Data Network Adaptor and a Subscriber Terminal Adaptor to communicate inband (using messages sent as data packets) as long as a dynamic connection is active.

In the case of a telecommunications system providing only Plain Old Telephone Service (POTS), the associated modems can be directed to save their state parameters via the Network Adaptor and/or the Subscriber Terminal Adaptor. Consequently, the transition of the dynamic connection to the pause state can be preceded by an optional prepare-for-pause signal that may again be optionally acknowledged with a ready-for-pause response from the appropriate device.

Another possibility is to make the transition of the dynamic connection to the dormant state conditional to the issuing of pause signals from both sides of the connection. Hence, the exchange in this case requires pause signals from both (adaptors) in order to transition to the dormant state.

The resumption of data activity to and/or from the datacom application using the circuit-switched telephony connection is detected by one or more wake-up sensors placed at suitable places along the connection path. It should be noted that the wake-up sensors can be implemented in both hardware as well as software.

It is important to emphasize that, in general, the detection of renewed activity requires at least two wake-up sensors. This is because the transition to the pause state causes certain core telecommunications resources to be released and made available for reuse by other applications. Consequently, every time a formerly active connection is (involuntarily) put into the pause state, the associated end-to-end connection path is physically partitioned into at least two disjoint segments.

Each of the two disjoint segments are conceptually part of the same connection. However, physically the two segments are no longer connected (except perhaps for the continuous connection through the signaling channel).

Since renewed activity on a dormant connection can first arise in either of the two or more disjoint segments, it is clearly desirable to have one wake-up sensors placed somewhere along each of the two or more disjoint segments.

In the preferred embodiment of the present invention, the wake-up sensors are implemented in software and embedded in the subscriber PC or the Subscriber Terminal Adaptor and additionally in the Data Network Adaptor. Such an arrangement permits the paired wake-up sensors to be sensitive to renewed activity arising in either of the two or more disjoint segments of the dormant circuit-switched telephony connection.

In one embodiment of the present invention, if an attempt to reactivate a dormant connection proves unsuccessful because of all of the connection capacity allocated for making dynamic connections becoming fully utilized (i.e. a congestion situation has arisen), then such a reactivation attempt is queued in one or more queues that are ordered by priority classes until such time that the connection resources needed to reactivate the dormant connection once again becomes available. Simultaneous with the queuing of the reactivation request, a wait signal may optionally be sent to the terminal originating the data traffic (e.g., by sending a "source quench" command)

In the preferred embodiment of the present invention, the dynamic connection service is activated by dialing a B-party number that is associated with the dynamic connection service. Dialing of B-numbers that are associated with the dynamic connection service causes the normal telephone protocol to be augmented by the new pause and wake-up signals.

In an alternative embodiment of the present invention, physical signal types that are part of the normal telephone protocol repertoire are automatically associated with the new pause and wake-up signals whenever certain designated B-numbers have been dialed.

On a POTS (Plain Old Telephone Service) subscriber line, the system and method of the present invention can be implemented by using line signaling techniques, e.g., hook flashing, polarity reversals and other similar techniques known to those of ordinary skill in the art. On an Integrated Services Digital Network (ISDN) subscriber line, the system and technique of the present invention can be implemented by using D-channel signaling.

It should be noted that ISDN service is traditionally offered in two flavors: the Basic Rate Interface (BRI) and the Primary Rate Interface (PRI). The BRI service comprises two bearer channels (B-channels) and one signaling channel (the D-channel). Hence, the BRI service is often denoted as 2B+D. The CCITT/ITU standard for ISDN service specifies the bandwidth of a B-channel at 64 Kbits/sec. and that of a D-channel at 16 Kbits/sec. The PRI service is either 24B+D (in the U.S.) or 32B+D (in Europe) and has an aggregate bandwidth of 1.544 Mbits/sec. (in the U.S.) or 2.048 Mbits/sec. (in Europe).

On the exchange side of the Subscriber Terminal Adaptor and the Data NetworkAdaptor, the pause and wake-up signaling is implemented using the D-channel. In an alternative embodiment of the present invention, the ISUP (Integrated Services User Part) protocol overlay of the CCITT/ITU Signaling System No. 7 (SS7) is used for the signaling between the Data Network Adaptor and the local exchange.

In yet a different implementation of the present invention, the dynamic connection service number and the B-party number are deliberately made different. In such a case, a subscriber activates the dynamic connection service by first dialing the appropriate dynamic connection service number. This causes the normal telephone protocol to be augmented by the pause and the wake-up commands. Once the dynamic connection service has been activated, the subscriber subsequently dials a B-party associated with a user of the dynamic connection service.

In one embodiment of the present invention, a subscriber attempting to use the dynamic connection service is authenticated by checking that the A-number (the subscriber's number) has not been barred from connecting to the particular B-number being dialed. In an alternative embodiment, a specific identification code or password (e.g., a PIN Personal Identification Number (PIN) code) associated with the dynamic connection service is used to control access to the dynamic connection service.

The dynamic connection service is implemented in the local exchange as part of the integrated, multi-functional software modules that also handle the control and supervision of calls and sessions. Such software also typically includes components capable of querying and verifying user identity, access filtering and server dial-up functions.

Two kinds of access control units are used to enable and control access to the dynamic connection service of the present invention: a Subscriber Terminal Adaptor and a Data Network Adaptor. Both types of adaptors monitor session activity (i.e., they play the role of the packet pause sensor).

Depending on the datacom application using the telephony connection augmented with the dynamic connection service, one or both of the adaptors are designed to notify the telephone exchange whenever a session is found to be inactive according to precalculated or specifically programmed criteria.

The notification of inactivity is performed by sending a pause signal. As explained earlier, the dynamic connection session then enters a dormant phase. As also explained earlier, the transition to the pause state causes the dynamic connection to be partitioned into at least two disjoint segments with the segment linking the two disjoint segments representing the critical core telecommunications resources. The linking segment resources are released for reuse by other users.

In one embodiment of the present invention, one or both of the Subscriber Terminal Adaptor and/or the Network Adaptor keeps a dormant session alive by periodically sending appropriate ("keep alive") messages to the subscriber terminal that is the host and also to the enterprise server connected to the data network.

In another embodiment of the present invention, the detection of renewed activity by wake-up sensors (optionally collocated in one or both adaptors) generates a wake-up signal that alerts the telephone exchange to reactivate a dormant session. In response, the telephone exchange reactivates the dormant connection to accommodate the renewed activity in the hitherto quiescent datacom session.

The physical implementation of the system and method of the present invention can be adapted depending upon the access techniques used by various subscribers. For example, subscribers may access the dynamic connection system through an analog Public Switched Telephone Network (PSTN) line, a digital Integrated Services Digital Network (ISDN) line, a wireless link using radio or optical signals, or via digital subscriber lines—including ADSL (Asymmetric Digital Subscriber Line) and/or VDSL (veryHigh Rate Digital Subscriber Line).

An alternative embodiment of the present invention, parts of the Subscriber Terminal Adaptor and/or the Data Network Adaptor are implemented in software or embedded in other access network equipment such as modems or line cards.

The dynamic connection service may also be implemented using modems that are responsive to flash signaling (i.e. software that is capable of generating and transmitting hookflashes) and to receive reversed polarity signaling information through software controlled lines. The dynamic connection service of the present invention can also be adapted to exchanges and switches that support a variety of bandwidths, e.g., multiples of 64 Kbits/sec. or 16 Kbits/sec. It is also possible to use the dynamic connection service of the present invention to provide asymmetric and/or unidirectional connections that can permit sessions in a form of half duplex mode.

One of the principal advantages of the method of the system and method of the present invention is that connection setup resources such as key code receivers, tone generators and processors are invoked and used only once per datacom application session. Additionally, in contrast to the requirements of the repeated dial-up technique used hitherto, the long dial-up times required for sending and analyzing multiple B-numbers has now been eliminated and replaced by a faster and simpler wake-up signal. The use of a wake-up alert improves resource utilization and also lowers the processing load on The core telecommunications resources.

Any connection resources that are not being used during a datacom session are released and made available for use by other active datacom or voice connections sessions. Consequently, the system and method of the present invention enables the sharing (and increases the utilization) of connection resources.

Yet another advantage of The present invention is that it permits greater centralization of the access routers that serve the gateways providing datacom access. The dynamic connection technique of the present invention also improves the utilization of the access gateways as well as the telephone access network by increased use of multiplexing techniques, e.g., time-sharing. The system and method of the present invention also permits economical and secure telephony connections for providing Internet Server Provider (ISP) access, permits telecommuting and facilitates enterprise-wide access to networks and services.

The present invention also facilitates emerging applications such as electronic commerce. The low-cost and secure telephony based connection can also permit data communication between multiple peer personal computers (PCS) and permit the interconnection of small LANs (Local Area Networks) to each other. An additional advantage of the system and method of the present invention is that it facilitates the creation of virtual LANs (VLANs).

Operation of the Present Invention Illustrated

Figure 10:
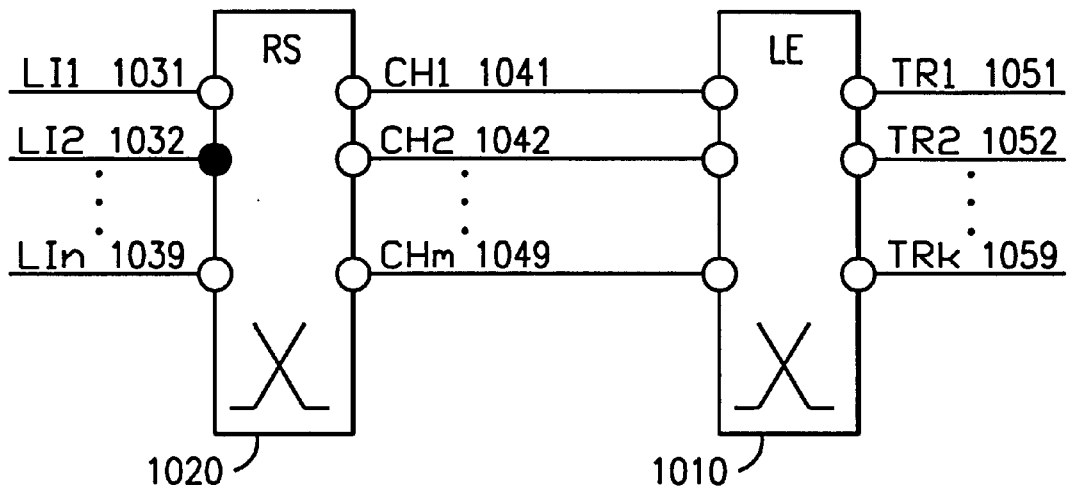
FIG. 10 shows a first phase in the operation of the preferred embodiment of the present invention where a user requests the establishment of a new communication session by issuing a "set-up" command.

The operation of the system and method of the present invention is best understood by considering an illustrative example. FIG. 10 shows the first phase in the operation of the preferred embodiment of the present invention where a user requests the establishment of a new communications session by issuing a "set-up" command.

As shown in FIG. 10, the Remote Switch 1020 is connected to multiple subscribers through n lines LI1 1031, L12 1032, . . . LIn 1039. Similarly, the Local Exchange 1010 is connected to k trunk lines TR1 1051, TR2 1052, . . . TRk 1059. The Remote Switch 1020 is connected to the Local Exchange 1010 through m channels CH1 1041, CH2 1042, . . . CHm 1049.

Figure 11:
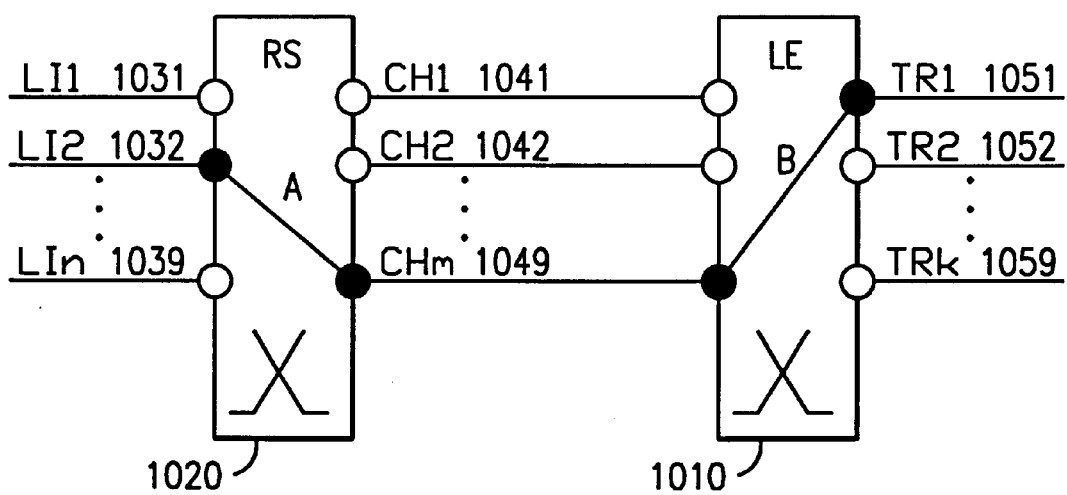
FIG. 11 shows a second phase in the operation of the preferred embodiment of the present invention where an end-to-end connection is established using a free channel between the remote switch and the local exchange and a free trunk from the local exchange towards the termination point of the connection.

FIG. 11 shows the second phase in the operation of the preferred embodiment of the present invention where an end-to-end connection is established between a subscriber (or client application) connected to line LI2 1032 and a remote (server) application connected to the Local Exchange 1010. The end-to-end connection uses a free channel CHm 1049 between the Remote Switch 1020 and the Local Exchange 1010 and a free trunk TR1 1051 from the Local Exchange 1010 towards the termination point of the connection. The switching connections made in the Remote Switch 1020 and the Local Exchange 1010 are indicated by the reference letters "A" and "B", respectively.

Figure 12:
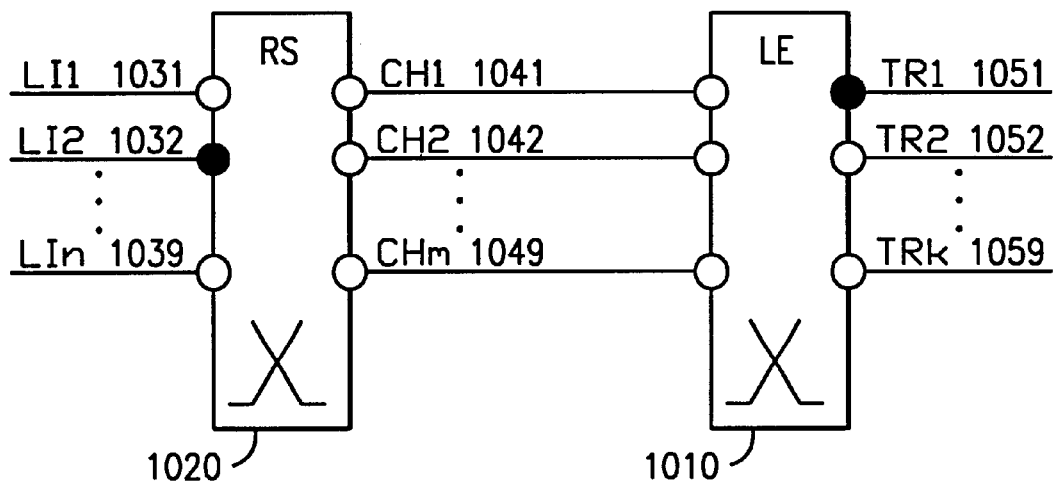
FIG. 12 shows a third phase in the operation of the preferred embodiment of the present invention where the lack of activity on the circuit-switched telephony connection results in the transition of the connection from the active state to the pause state causing the release of the inactive channel and associated connection resources in the Remote Switch (RS) and Local Exchange (LE)

FIG. 12 shows the third phase in the operation of the preferred embodiment of the present invention where a lack of activity for a preselected time interval over the circuit-switched telephony connection between line LI2 1032 and trunk TR1 1051 results in the status of the connection being changed from the active state to the paused state. This, in turn, causes the release of the inactive channel CHm 1049 and associated connection resources in the Remote Switch (RS) 1020, the Local Exchange (LE) 1010 and intermediate elements in the link connecting the two.

Figure 13:
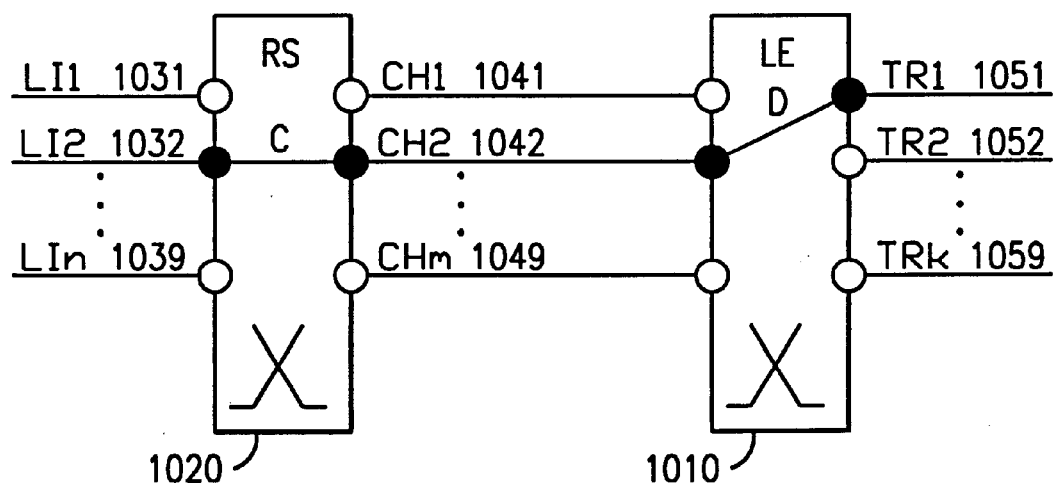
FIG. 13 shows a fourth phase in the operation of the preferred embodiment of the present invention where the dormant connection between the subscriber line and the trunk line is reactivated in response to the detection of renewed activity in the hitherto dormant connection.

FIG. 13 shows the fourth phase in the operation of the preferred embodiment of the present invention where the connection between the subscriber line LI2 1032 and the trunk line TR1 1051 is reactivated in response to the detection of renewed activity in the hitherto dormant connection. The new connections that are made in the Remote Switch 1020 and the Local Exchange 1010 are indicated by the reference letters "C" and "D", respectively.

It should be noted that a reactivated connection shown between the Remote Switch 1020 and the Local Exchange 1010 no longer uses the channel CHm 1049 that was used earlier but instead uses a new channel CH2 1042. This is one of the key features of the dynamic connection technique of the present invention. The system and method of the present invention permits all of the channels CH1 1041, CH2 1042, . . . CHm 1049 between the Remote Switch 1020 and the Local Exchange 1010 to be pooled and treated as a centrally allocable resource.

When an erstwhile active connection is put into the dormant state due to a lack of activity on the datacom application using the connection, the channel between the Remote Switch 1020 and the Local Exchange 1010 that is associated with the (inactive) connection is reassigned to other active connections. When renewed activity is detected on either side of the RS/LE link, the period of dormancy of the paused connection automatically comes to an end. The datacom session showing renewed activity is allocated a new channel, without regard to the specific channel(s) previously allocated, unless circumstances dictate otherwise.

Signaling Diagrams for the POTS and ISDN Contexts

Figure 16:
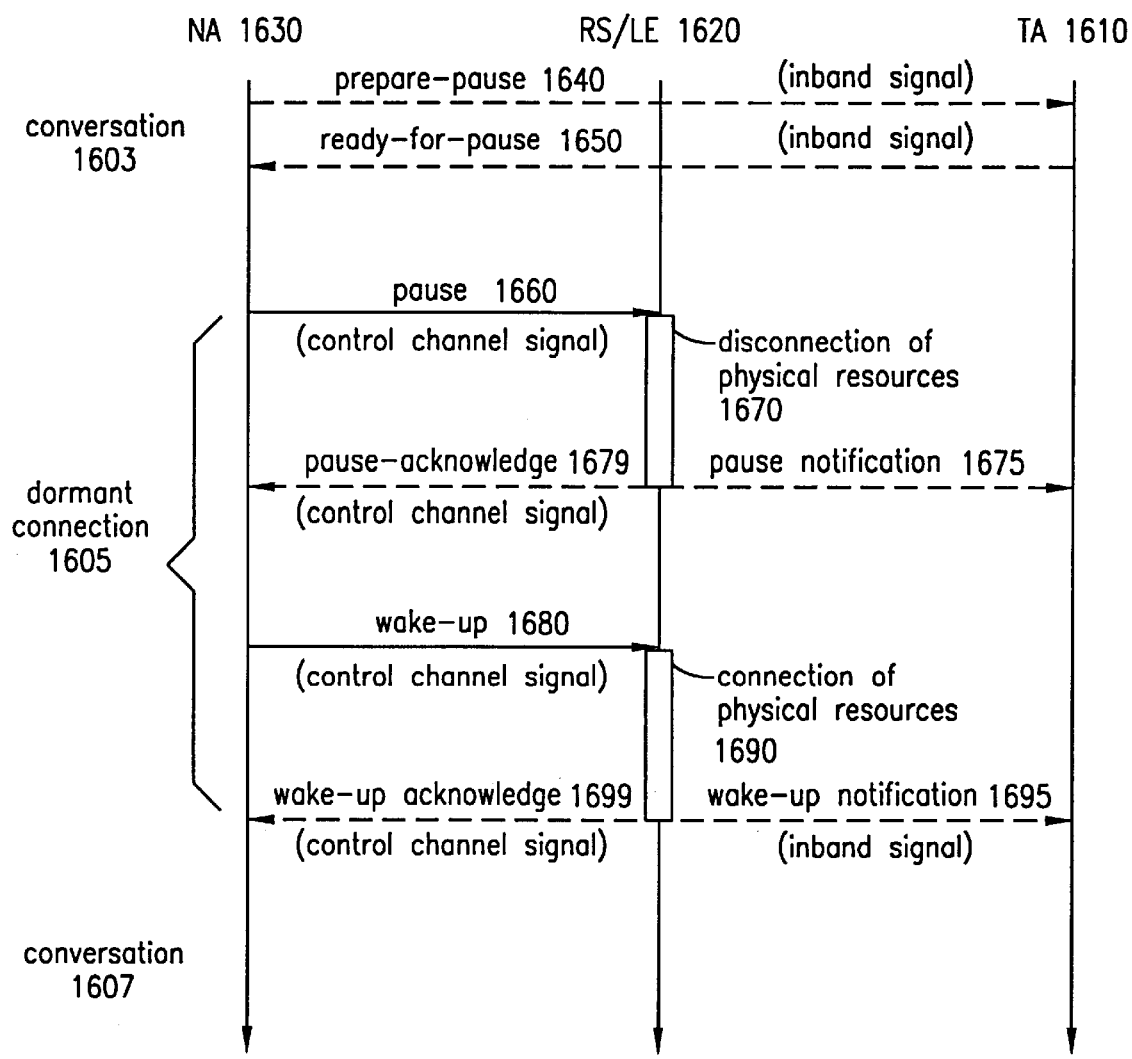
FIG. 16 shows a signaling diagram for an alternative embodiment of the present invention for a POTS-type connection showing the pause and the wake-up commands being both issued by the Network Adaptor.
Figure 17:
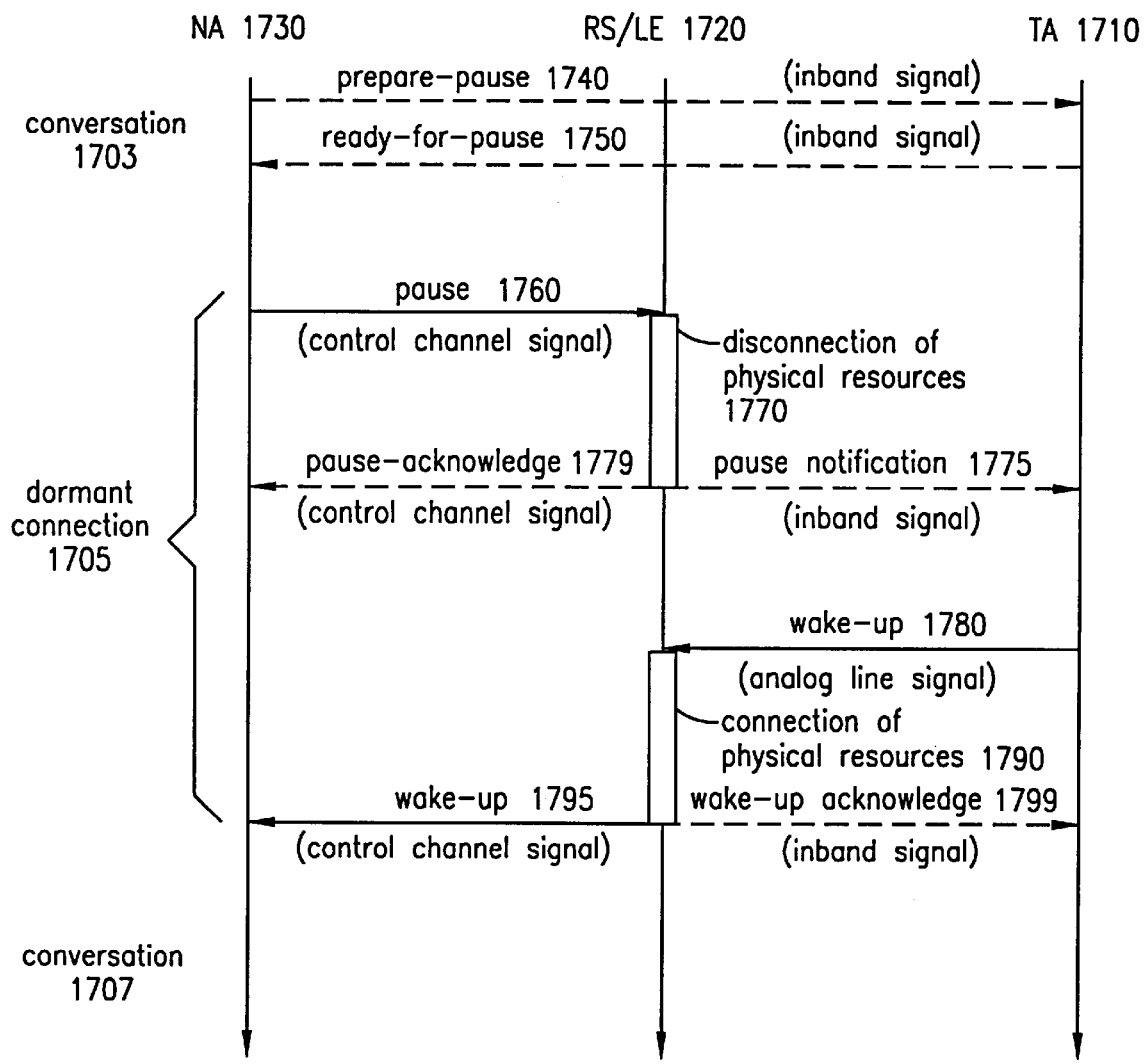
FIG. 17 shows a signaling diagram for a further alternative embodiment of the present invention for a POTS-type connection where the pause command is issued by a Network Adaptor while the wake-up command is issued by a Subscriber Terminal Adaptor.
Figure 18:
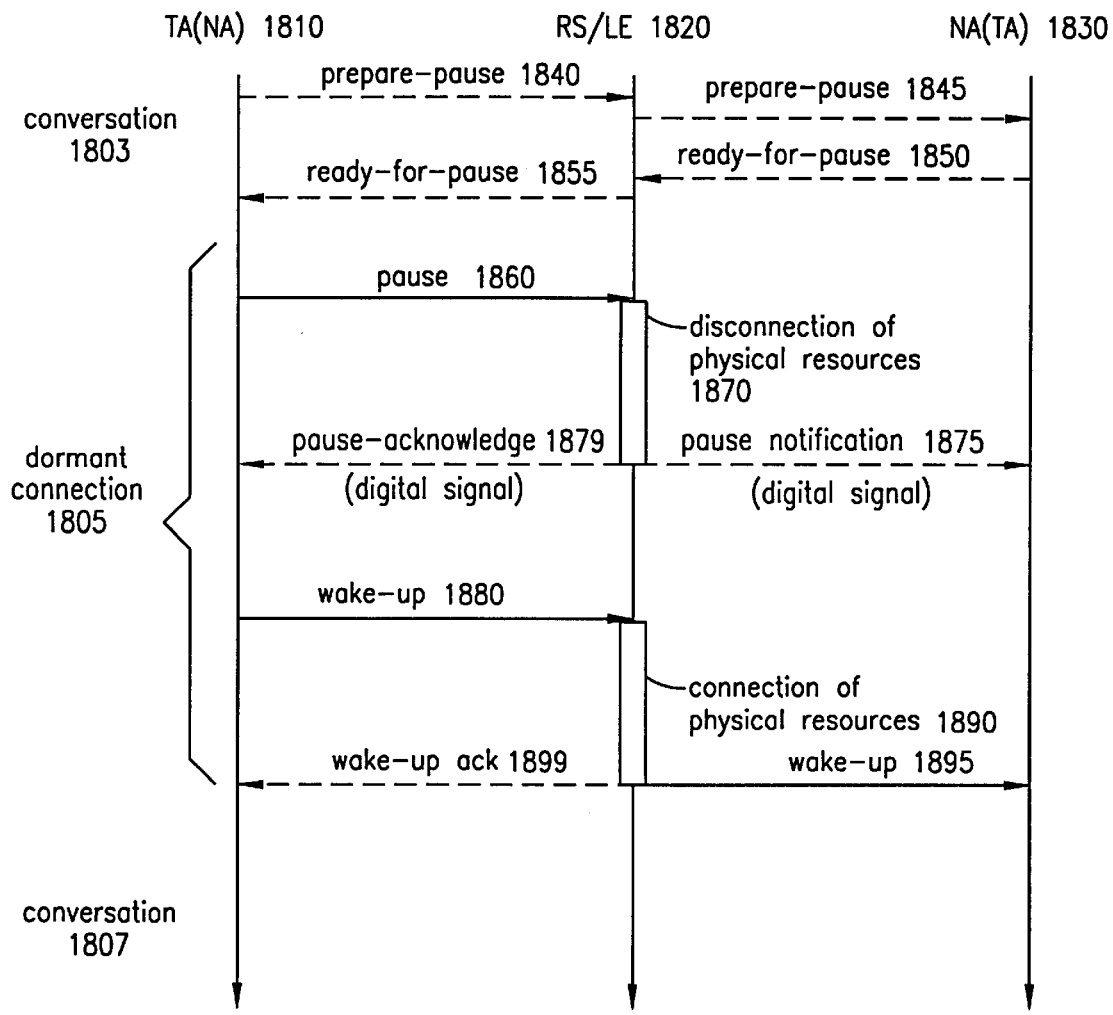
FIG. 18 shows a signaling diagram for another alternative embodiment of the present invention for a digital signaling context showing the transition of a connection from the active state to the dormant state and back again to the active state.

The system and method of the present invention can be used in both analog signaling (e.g. POTS) as well digital signaling (e.g., ISDN) contexts. FIGS. 14–17 show the signaling diagrams when the present invention is utilized with POTS-type connections. FIG. 18 shows the signaling diagram when the present invention is utilized with ISDN-type connections.

In the signaling diagrams depicted in FIGS. 14–18, the time axis is vertical and runs vertically from top to bottom. Hence, the relative timing of the various signals can be determined by reading each of the diagrams sequentially from top to bottom. The state of the connection (i.e. active or dormant) is indicated on the left side of the three vertical time axes for the three devices shown in each of the figures: the Subscriber Terminal Adaptor (TA), the Network Adaptor (NA) and the Remote Switch/Local Exchange (RS/LE).

Horizontal dashed or broken lines have been used in FIGS. 14–18 to indicate signals that are optional. Optional signals can be used to provide additional functionality or to increase the reliability of the system and method of the present invention.

It is useful to reiterate that in a POTS-type application of the present invention, signaling information is usually exchanged between the Subscriber Terminal Adaptor and the Network Adaptor inband and between the Network Adaptor and the Remote Subscriber Stage or Local Exchange over a digital (common) control channel. Consequently, four combinations of pause and wake-up signaling need to be studied.

In the first two of these cases, the pause command is issued by Subscriber Terminal Adaptor while in the last two cases, the pause command is generated by the Network Adaptor. In the first and the fourth cases, the wake-up command originates at the Subscriber Terminal Adaptor while in the second and the third cases, the Network Adaptor is the source of the wake-up command.

Figure 14:
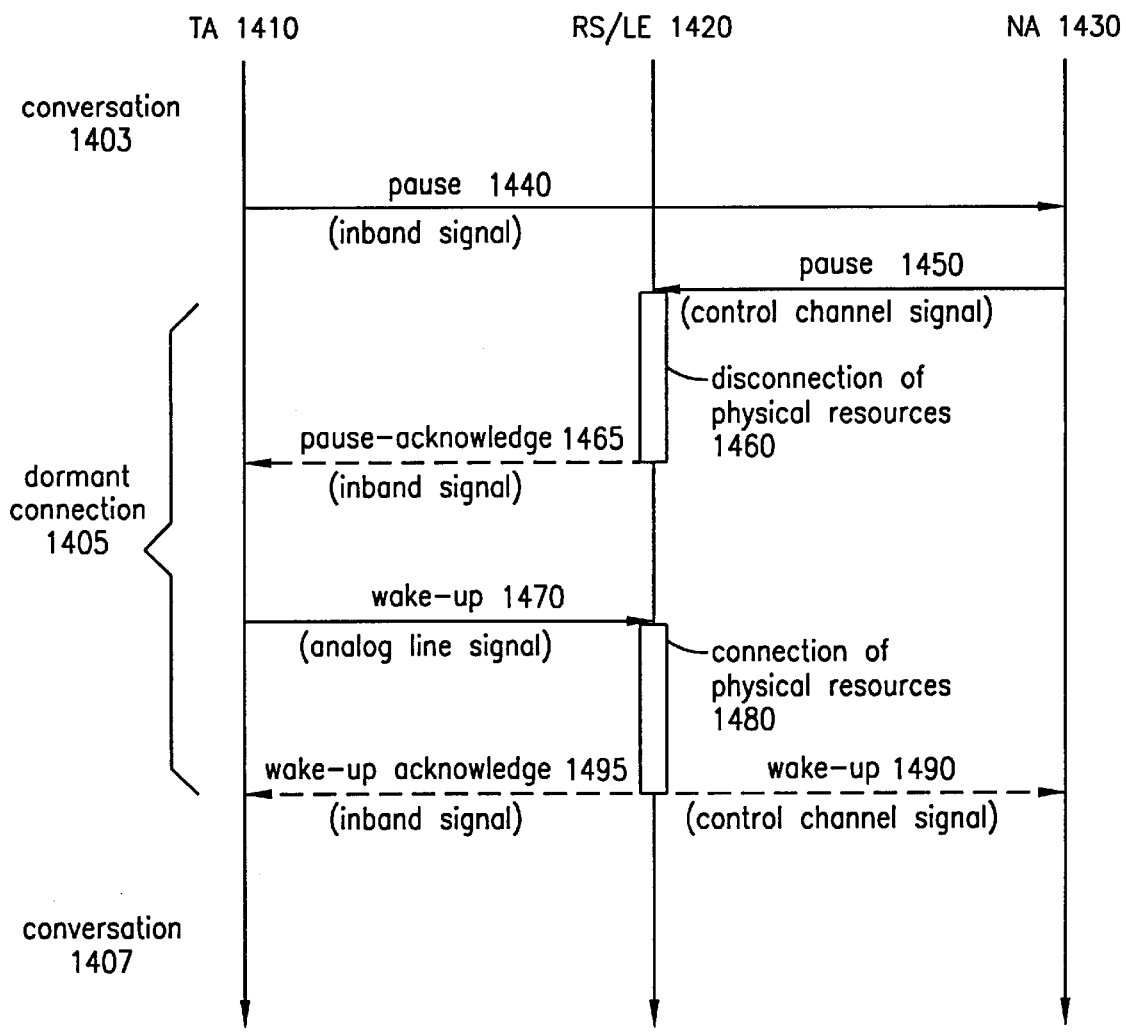
FIG. 14 shows a signaling diagram for the preferred embodiment of the present invention for a POTS-type connection showing both the pause and the wake-up commands being issued by a Subscriber Terminal Adaptor.

FIG. 14 shows a signaling diagram for the preferred embodiment of the present invention for a POTS-type connection showing both the pause command 1440 and the wake-up command 1470 being issued by the Subscriber Terminal Adaptor 1410. Each of the three vertical lines in FIGS. 14–18 represents a different physical or logical analysis point along a connection-oriented circuit.

Thus, for example, the vertical line labeled "TA 1410" in FIG. 14 represents a reference point for the signals sent or received by the Subscriber Terminal Adaptor 1410. Likewise, the vertical line labeled "RS/LE 1420" represents the signals sent or received by the Remote Switch and/or the Local Exchange 1420. Similarly, the signal interchange to and from the Network Adaptor 1430 is depicted along the rightmost vertical line (labeled "NA 1430") in FIG. 14.

After a connection has been established, the connection enters the active conversation state 1403. The precursor steps to reaching this active conversation state 1403 (i.e., call set-up, busy number redialing, etc.) have not been illustrated in FIG. 14 (or in FIGS. 15–18) but would be well known to those of ordinary skill in the art.

When the packet pause sensor in the Subscriber Terminal Adaptor 1410 fails to detect any communication activity over the connection for a preselected period of time, the Subscriber Terminal Adaptor 1410 sends a pause command 1440 as an inband signal directly to the Network Adaptor 1430.

The Network Adaptor 1430 can directly communicate with the Remote Switch/Local Exchange (RS/LE) 1420 using the control channel. The Network Adaptor 1430 relays the pause command to the RS/LE 1420 over the control channel as indicated at 1450. This results in the disconnection of the core physical resources allocated to the connection as indicated by block 1460 in FIG. 14.

This is optionally followed by an inband pause-acknowledge signal from the RS/LE 1420 to the TA 1410 that had issued the pause command 1440. It should be noted that in the POTS signaling context, the Subscriber Terminal Adaptor 1410 and the Network Adaptor 1430 can receive acknowledgment of pause and wake-up signaling via the modem carrier detection mechanism. The connection now transitions from the active (conversation) state 1403 to the dormant state 1405.

When renewed activity in a currently dormant connection is detected by a wake-up sensor collocated in the Subscriber Terminal Adaptor 1410, the Subscriber Terminal Adaptor sends a wake-up signal 1470 as an analog line signal to the Remote Switch/Local Exchange (RS/LE) 1420. Conditional on the availability of free connection resources, the RS/LE 1420 allocates the appropriate physical resources (including a channel linking the RS to the LE) to the dormant connection. This is shown by block 1480 in FIG. 14.

As soon as the necessary connection resources have been identified and allocated to the dormant connection, the RS/LE 1420 optionally sends a wake-up signal 1490 to the Network Adaptor 1430 over the common control channel. As mentioned earlier, horizontal broken lines have been used in FIGS. 14–18 to indicate optional signals. This in turn is followed by an optional inband wake-up acknowledge signal 1495 from the RS/LE 1420 to the Subscriber Terminal Adaptor 1410. This causes the hitherto dormant connection 1405 to revert back to the active (conversation) state 1407.

Figure 15:
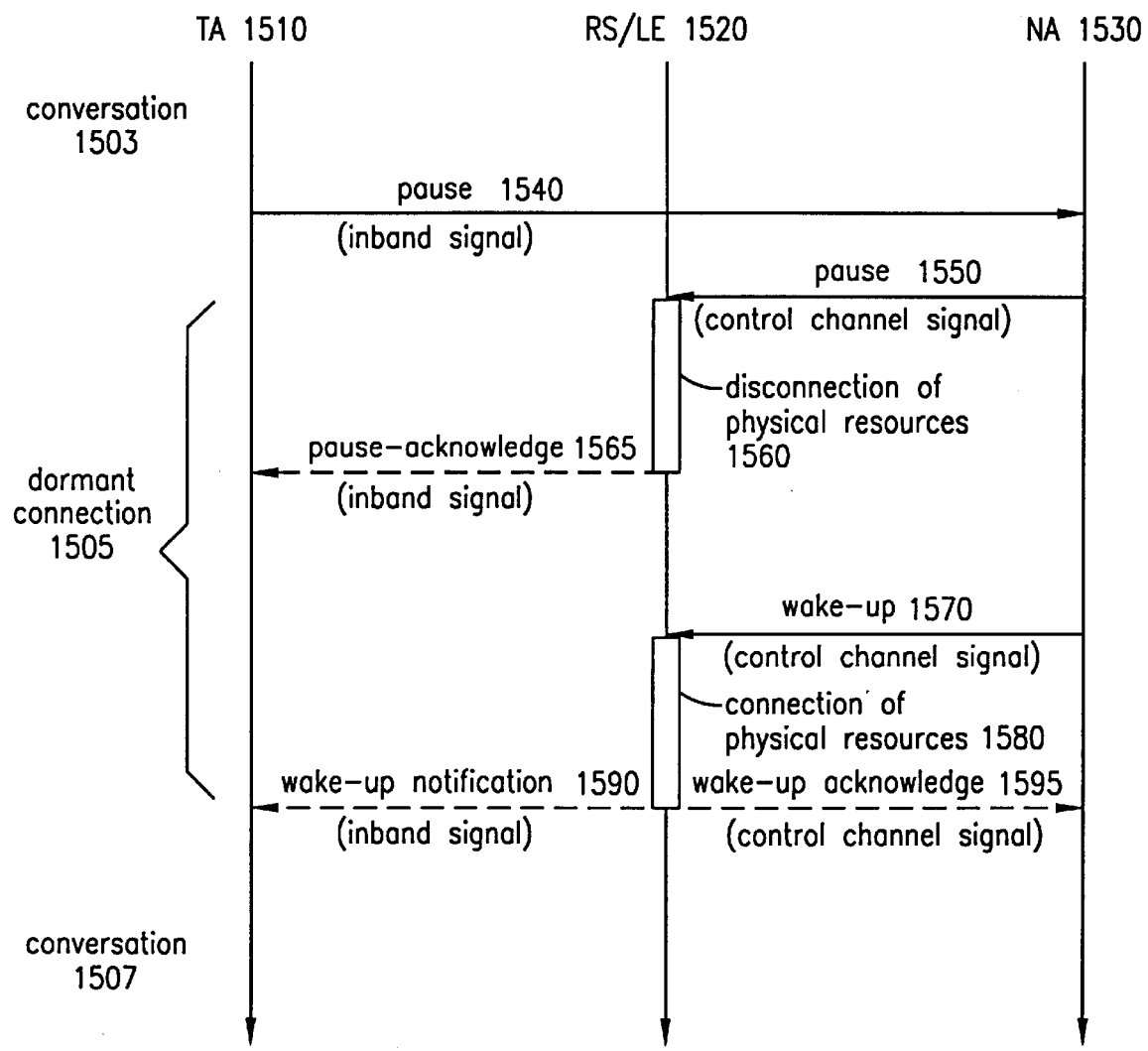
FIG. 15 shows a signaling diagram for the preferred embodiment of the present invention for a POTS-type connection where the pause command is issued by a Subscriber Terminal Adaptor while the wake-up command is issued by a Network Adaptor.

FIG. 15 shows the signaling diagram for the preferred embodiment of the present invention for a POTS-type connection where the pause command 1540 originates from the Subscriber Terminal Adaptor 1510 while the wake-up command 1570 is generated by the Network Adaptor 1530. As in the previous figure, FIG. 15 depicts the signals received and/or sent by the Subscriber Terminal Adaptor 1510 and the Remote Switch/local Exchange (RS/LE) 1520 and the Network Adaptor 1530 along three vertical lines that run from top to bottom as indicated by the directional arrows on the lines.

The process shown in FIG. 15 starts with a connection being initially in the active conversation state 1503. When a packet pause sensor in the Subscriber Terminal Adaptor 1510 fails to detect any data transmission activity over an ostensibly active connection, the Subscriber Terminal Adaptor 1510 transmits a pause command 1540 as an inband signal directly to the Network Adaptor 1530. The Network Adaptor, which is equipped to communicate directly with the RS/LE 1520 over a common control channel, relays the pause command 1540 to the RS/LE 1520 as a control channel signal 1550 as depicted in FIG. 15.

Upon receiving the pause command, the RS/LE 1520 disconnects the physical resources associated with the connection segment spanning the RS-LE link, as illustrated at 1560 in FIG. 15. This is optionally followed by an inband pause-acknowledge signal 1565 from the RS/LE 1520 to the Subscriber Terminal Adaptor 1510. The active connection now enters the dormant (or paused) state 1505. As before, this permits the unutilized core physical connection resources (both switching and transport) to be reallocated to other connections having a greater need for, or a greater ability to use, these resources.

At a later instant in time, renewed activity may be detected in a currently-inactive connection by a wake-up sensor preferably collocated in the Network Adaptor 1530. In response, the Network Adaptor sends a wake-up command 1570 to the RS/LE 1520 over the common control channel. This, in turn, leads to the allocation of appropriate physical resources in the RS/LE 1520 as necessary to activate the now-dormant connection and also results in the reallocation of connection resources as shown at 1580.

Since the pause command originated in the Subscriber Terminal Adaptor 1510, the reallocation of connection resources at 1580 is optionally followed by an inband wake-up notification signal 1590 from the RS/LE 1520 to the Subscriber Terminal Adaptor 1510. After this, RS/LE 1520 sends an optional wake-up acknowledge signal 1595 over the control channel to the Network Adaptor 1530. This causes the dormant connection 1505 to once again re-enter the active conversation state 1507.

It is important to emphasize that the principal difference between the embodiments of the present invention depicted in FIGS. 14 & 15 is that the former case covers the situation where the renewed activity has been detected by a wake-up sensor located on the Subscriber Terminal Adaptor side of the RS/LE link 1420 whereas the latter case covers the situation where the renewed activity has been detected by a wake-up sensor located on the Network Adaptor side of the RS/LE link 1520.

It should be reiterated that, in theory, the pause and the wake-up sensors may be physically located at suitable points along the connection path. However, it has been found to be logistically simpler for the pause and the wake-up sensors to be collocated with the appropriate Subscriber Terminal Adaptors 1510 and/or the Network Adaptors 1530. As detailed elsewhere in this patent application, each dynamic connection needs at least two unidirectional wake-up sensors, i.e., one in each direction, and one pause bidirectional sensor. FIG. 16 shows a signaling diagram for an alternative embodiment of the present invention for a POTS-type connection showing both the pause command 1660 and the wake-up command 1680 being issued by the Network Adaptor 1630. As in the cases illustrated in the earlier FIGS. 14 & 15, the process starts with a connection initially being in the active conversation state 1603.

Upon a determination of a lack of data activity in an ostensibly active connection, the Network Adaptor 1630 optionally sends a prepare-for-pause command 1640 as an inband signal directly to the Subscriber Terminal Adaptor 1610. After monitoring and reviewing the connection status, the Subscriber Terminal Adaptor 1610 optionally sends back to the Network Adaptor 1630 a ready-for-pause response 1650, again as an inband signal.

The Subscriber Terminal Adaptor 1610 sends a ready-for-pause response 1650 after also making sure that no relevant data transmissions are currently in the pipeline. The signaling diagram of FIG. 16 depicts the prepare-for-pause command 1640 and the ready-for-pause response 1650 using dotted arrows to indicate that the use of these preliminary signals constitute an optional extension of the system and method of the present invention.

Upon receiving a ready-for-pause response 1650, the Network Adaptor 1630 sends a pause command 1660 as a control channel signal directly to the RS/LE 1620. This causes the RS/LE 1620 to release the core physical resources allocated to the connection as shown at 1670. If the generation of the pause signal 1660 was preceded by the (optional) prepare-for-pause signal 1640, the RS/LE 1620 next notifies the Subscriber Terminal Adaptor 1610 of the disconnection of core physical resources by sending an optional inband pause notification signal 1675.

Regardless of whether or not a pause notification signal 1675 was generated, the disconnection of physical resources is then optionally acknowledged by the RS/LE 1620 to the Network Adaptor 1630 via a pause-acknowledge signal 1679 sent over the control channel. The active connection then enters the paused state 1605.

Upon the detection of renewed activity by a wake-up sensor located on the Network Adaptor side of the RS/LE link 1620, the Network Adaptor 1630 sends a wake-up command 1680 over the common control channel to the RS/LE 1620. In response, the RS/LE 1620 marshals and allocates the necessary core telecommunications resources to the dormant connection, resulting in the dormant connection 1605 reverting to the active conversation state 1607 as shown at 1690 in FIG. 16.

The reactivation of the dormant connection by the reallocation of physical resources at 1690 is optionally notified by the RS/LE 1620 to the Subscriber Terminal Adaptor 1610 by sending an optional inband wake-up notification signal 1695, especially if the generation of the pause signal 1660 had been preceded by the (optional) prepare-for-pause signal 1640.

Regardless of whether or not a wake-up notification signal 1695 was generated, the re-allocation of physical resources at 1690 is then optionally acknowledged by the RS/LE 1620 to the Network Adaptor 1630 via a wake-up-acknowledge signal 1699 sent over the control channel.

It should be emphasized that the alternative embodiment of the present invention illustrated in FIG. 16 and described in detail earlier comprises an optional preliminary signaling component using the prepare-for-pause command 1640 and the ready-for-pause response 1650.

It should also be noted that the principal differences between the embodiments shown in FIGS. 14 & 16 derive from the fact that the pause and the wake-up commands originate from different sides of the RS/LE link. In FIG. 14, both the pause command 1440 as well as the wake-up command 1470 were issued by the Subscriber Terminal Adaptor 1410. In contrast, the pause command 1660 and the wake-up command 1680 shown in FIG. 16 were both generated by the Network Adaptor 1630. FIG. 17 shows the signaling diagram for yet another alternative embodiment of the present invention for a POTS-type connection where the pause command 1760 is issued by the Network Adaptor 1730 while the wake-up command 1780 is issued by the Subscriber Terminal Adaptor 1710.

As in FIGS. 14–16, the process starts with a connection reaching the active conversation state 1703. Upon determining a lack of activity on a connection, the Network Adaptor 1730 sends an optional prepare-for-pause command 1740 as inband signal to the Subscriber Terminal Adaptor 1710. As soon as the Subscriber Terminal Adaptor 1710 is able to determine that there are no impending data transfers that would be frustrated by the imminent transition to the paused state 1705, the Subscriber Terminal Adaptor 1710 optionally sends back a ready-for-pause response 1750 (as an inband signal) to the Network Adaptor 1730.

Upon receiving a ready-for-pause acknowledgment 1750, the Network Adaptor 1730 sends a pause command 1760 over the control channel directly to the RS/LE 1720. This results in the release of core telecommunications resources by the RS/LE 1720 that had been earlier allocated to the now-inactive connection as shown as 1770. The active connection then transitions to the dormant phase 1705.

If the generation of the pause signal 1760 had been preceded by the (optional) prepare-for-pause signal 1740, the RS/LE 1720 then optionally notifies the Subscriber Terminal Adaptor 1710 of the disconnection of core physical resources by sending the optional inband pause notification signal 1775.

Regardless of whether or not a pause notification signal 1775 was generated, the disconnection of physical resources is also optionally acknowledged by the RS/LE 1720 to the Network Adaptor 1730 that generated the pause command 1780 via a pause-acknowledge signal 1779 sent over the control channel. The active connection then enters the dormant state 1705.

Upon the detection of renewed activity by a wake-up sensor located on the Subscriber Terminal Adaptor side of the RS/LE link 1720, the Subscriber Terminal Adaptor 1710 sends a wake-up command 1780 to the RS/LE 1720 as an analog line signal. As before, the RS/LE 1720 then reallocates the appropriate physical resources needed to reactivate the dormant connection as shown at 1790.

As soon as the dormant connection has been reactivated, the analog wake-up signal 1780 from the Subscriber Terminal Adaptor 1710 is relayed by the RS/LE 1720 to the Network Adaptor 1730 over the common control channel as the wake-up signal 1795. This is optionally followed by an inband wake-up acknowledge signal 1799 sent from the RS/LE 1720 to the Subscriber Terminal Adaptor 1710 that had initiated the wake-up sequence in this case. This completes the reversion of the dormant connection 1705 back to the active conversation state 1707.

It should be emphasized that the alternative embodiment of the present invention depicted in FIG. 17 comprises an optional preliminary signaling phase using the prepare-for-pause command 1740 and the ready-for-pause response 1750. It should be noted that the embodiments of the present invention depicted in FIGS. 15 & 17 both show the pause and the wake-up commands as originating from devices on opposite sides of the appropriate RS/LE link 1520 and 1720 respectively.

In FIG. 15 the pause command 1540 had been issued by the Subscriber Terminal Adaptor 1510 while the wake-up signal 1570 had been issued by the Network Adaptor 1530. In contrast, in FIG. 17, the pause command 1760 had been issued by the Network Adaptor 1730 while the wake-up command 1780 had been issued by the Subscriber Terminal Adaptor 1710.

Since the Network Adaptor 1530 in FIG. 15 is connected to the RS/LE 1520 via a common control channel, the Network Adaptor sends the wake-up signal directly to the RS/LE 1520. In contrast, when the Subscriber Terminal Adaptor 1710 in FIG. 17 sends an analog control line signal 1780 to the RS/LE 1720, the embodiment shown in FIG. 17 requires the wake-up signal to be relayed to the Network Adaptor 1730 as shown at 1795. It should be noted that the common control channel is accessible by both the Network Adaptor 1730 as well as the RS/LE 1720.

In contrast to the POTS-type application context, in an ISDN-type application of the present invention, all signaling is digital. Consequently, it makes no difference whether the pause and the wake-up signals originate in the Subscriber Terminal Adaptor or the Network Adaptor. FIG. 18 shows the signaling diagram when the present invention is utilized with ISDN-type connections.

The alternative embodiment of the present invention for the digital signaling context depicted in FIG. 18 shows the transition of a connection from the active state to the dormant state and back again to the active state. Just like the analog signaling context depicted in FIGS. 14–17, the digital signaling context depicted in FIG. 18 starts out with a connection being in the active conversation state 1803.

It should be noted at the outset that (unlike the analog signaling context) in a digital signaling context (such as that associated with an ISDN subscriber line), a digital control channel becomes available all the way from the Subscriber Terminal Adaptor 1810 adjacent to the subscriber terminal to the Network Adaptor 1830 adjacent to the data network being accessed. Consequently, the exchange of signaling messages between the Subscriber Terminal Adaptor 1810 and the RS/LE 1820 no longer needs to be done using inband messages, but can instead be communicated using the digital control channel.

Since a digital control channel is now available all the way from the Subscriber Terminal Adaptor 1810 to the Network Adaptor 1830 through the RS/LE link 1820, the various combinations of pause and wake-up commands shown in FIGS. 14–17 can be unified into a single signaling diagram as illustrated in FIG. 18.

FIG. 18 covers four different signaling cases: (1) when the pause and the wake-up commands are both initiated by the Subscriber Terminal Adaptor; (2) when the pause command is initiated by the Subscriber Terminal Adaptor but the wake-up signal originates from the Network Adaptor; (3) when the pause and the wake-up commands are issued by the Network Adaptor; and (4) when the pause command is issued by the Network Adaptor while the wake-up signal originates from the Subscriber Terminal Adaptor. In the digital signaling context, all four of these cases can be subsumed into a single signaling diagram since the signaling is entirely digital throughout the connection.

The dynamic connection concept for the digital signaling context can be understood by reference to FIG. 18. An end-to-end datacom connection initially starts out in the active conversation state 1803. In response to a lack of data traffic for a preset period of time, the Subscriber Terminal Adaptor 1810 optionally sends a prepare-for-pause command 1840 to the RS/LE 1820. The RS/LE 1820 relays the prepare-for-pause command to the Network Adaptor 1830 as shown at 1845.

After verifying that no data transmissions are in transit in the reverse direction, the Network Adaptor 1830 sends a ready-for-pause response 1850 to the RS/LE 1820 which in turn relays this acknowledgment back to the Subscriber Terminal Adaptor 1810 that had initially requested a pause as shown at 1855. Upon receiving the acknowledgment message, the Subscriber Terminal Adaptor 1810 issues a pause command 1860 to the RS/LE 1820.

The RS/LE 1820 then disconnects the core physical resources allocated to the connection as shown at 1870. If the generation of the pause signal 1860 had been preceded by the (optional) prepare-for-pause signal 1840, the RS/LE 1820 then optionally notifies the Network Adaptor 1830 of the disconnection of core physical resources by sending the optional pause notification signal 1875 over the control channel.

Regardless of whether or not a pause notification signal 1875 was generated, the disconnection of physical resources is also optionally acknowledged by the RS/LE 1820 to the Subscriber Terminal Adaptor 1810 that generated the pause command 1860 via a pause-acknowledge signal 1879 sent over the digital control channel. This completes the transition of the connection from the active conversation state 1803 to the dormant connection state 1805.

It is important to emphasize that the pause signal 1860 could just as easily have originated from the Network Adaptor 1830 as from the Subscriber Terminal Adaptor 1810 because of the symmetry of the signaling links between the Subscriber Terminal Adaptor 1810 and the RS/LE 1820 on the one hand, and the signaling links between the Network Adaptor 1830 and the RS/LE 1820 on the other. This is indicated in FIG. 18 by the parenthetical notations "TA(NA) 1810" and "NA (TA) 1830".

When renewed activity is detected by the Subscriber Terminal Adaptor 1810, it sends a wake-up command 1880 to the RS/LE 1820. The RS/LE 1820 then allocates the appropriate physical resources needed to reactivate the dormant connection, as shown at 1890. The RS/LE 1820 then relays, at 1895, the wake-up command 1880 received from the Subscriber Terminal Adaptor 1810 to the Network Adaptor 1830. The RS/LE 1820 follows this up by optionally acknowledging the wake-up command 1880 back to the Subscriber Terminal Adaptor 1810 with a wake-up acknowledgment command 1899. This returns the dormant connection 1805 back to the active (conversation) slate 1807.

It should be reiterated that just like with the pause command 1860, the wake-up command 1880 too can originate from either the Subscriber Terminal Adaptor 1810 or the Network Adaptor 1830.

It should, therefore, be understood that a dynamic connection with ISDN or other digital systems may also implement the pause and wake-up functionality by: (1) calling a number associated with a dynamic connection service; (2) a disconnect signal simulates the pause signaling and the pause signaling and the call is actually not terminated and the connection is made dormant; (3) a new setup signal generated by the terminal or network adaptor containing the same B number as in the previously dialed number stored in the exchange is interpreted as a wake-up signal resulting in a transition from dormant to active conversation state; and (4) the call could in this case be actually terminated by sending a different B-number via a setup signal.

Extensions and Enhancements of the Dynamic Connection Concept

The system and method of the present invention can be extended and enhanced to provide additional features and services. For example, the addition of security features can permit secure telecommunications, with the optional authentication of a subscriber being a precursor to providing access to information needing higher levels of security clearance. This can be implemented by first checking that a particular A-number invoking the dynamic connection service is associated with a user permitted to access the B-number. Furthermore, the A-subscriber can be required to provide a specific PIN code associated with the dynamic connection service. Such a security scheme can be additionally enhanced by voice-recognition type authentication scheme.

The dynamic connection service of the present invention can also permit a telephone company to serve as the custodian of a secure network that enables secure and private communication between public users and an enterprise, e.g., a credit card company. In such an exemplary application, the credit card company could issue transaction clearance tickets that are used by a client as part of a digital signature later transmitted over the Internet. This technique can thus provide added security and eliminate the need to transmit unencoded credit card information over open networks.

It is also possible to extend the signaling scheme beyond the pause and the wake-up commands. Thus, for example, one could have a short sleep command and a long sleep command. Another useful signaling enhancement would be to permit the parking and/or toggling of a dynamic connection. This could permit a subscriber to communicate with third-party telephone users, computer terminals or systems.

It should be understood that, although the embodiments of the present invention have been based upon particular configurations of Ericsson's AXE network system, the subject matter of the present invention is not so limited and is, instead, directed to all such network configurations, which may generically be described as a network of nodes. It should, therefore, be further understood that the aforementioned "core telecommunications resources" described herein in the context of AXE equipment should not be so limited and instead be directed to a variety of shared system resources, e.g., transmission and switching resources, which are allocated and deallocated in accordance with the teachings of the present invention set forth hereinabove.

In view of the above, it should be understood that the aforedescribed pause and wake-up commands or signals may be relayed to other "nodes" in the network, establishing a cross-network dynamic connection. In this way the system and method of the present invention may be utilized at the transit and tandem exchange levels in the network, as is understood by those skilled in the art.

It should also be understood that the preferred embodiment of the present invention includes the capability of storing or caching connecting information pertaining to an end-to-end connection, i.e., sufficient context information is stored about that connection to enable the system, upon reactivation of data communications at either end of the connection, to reestablish or reactivate the connection. As is understood to those skilled in the art, the various context parameters and variables are associated with a particular communications state, making a further call unnecessary to resume a telephonic connection despite the possibility that different shared or "core" resources may be employed.

It should further be understood that some subscribers to a system employing the deallocation/reallocation techniques of the present invention may opt out of these features and consequently pay a higher price to maintain the active communications link despite periods of dormancy. A subscriber status flag or other marker (or a timer) may be associated with such users to indicate their connection preference. For example, a subscriber active status flag, marker or timer may be stored within a memory unit within a subscriber's terminal, at the local exchange, within the network control system 41 of FIG. 1 or any of a wide variety of other nodes. The other subscribers by permitting system component reallocation during dormant periods, should, therefore, pay a smaller fee.

It should additionally be understood that the deallocated or released shared components within a given connection segment may be used by another telecommunications application, e.g., a datacom application program, a telephonic application, via conventional phone or mobile terminal connection, or other such applications. Thus, when a datacom application program becomes dormant, e.g., due to modem camping, shared resources may be seized by another such application, a telephonic connection, an ISDN connection or any of a variety of alternative telecommunications applications.

Yet another enhancement of the system and method of the present invention could be to save trunk and modem resources by pooling them. Last but not the least, the system and method of the present invention also makes possible the provision of new services such as server-controlled multicasting provided that the exchange switch can support such types of connections.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. In a telecommunications network, a method for increasing the utilization efficiency of core telecommunications resources utilized by a datacom application program across an end-to-end connection, the method comprising the steps of:
   dividing the end-to-end connection into at least two segments, including a first segment spanning the core telecommunications resources associated with the end-to-end connection;
   monitoring transmissions over the end-to-end connection until transmissions cease for a preselected period of time and generating a first signal in response thereto, wherein said first signal is a cause command;
   deactivating the first segment in response to the generation of the first signal and releasing the core telecommunications resources associated with the deactivated first segment for reuse by a telecommunications applications causing segments other than said first segment of said end-to-end connection to become dormant;
   monitoring the transmission activity in said other segments of the end-to-end connection until transmissions continue in at least one of said other segments and generating a second signal in response thereto; and
   reactivating the first segment of said end-to-end connection in response to the generation of the second signal.

2. The method of claim 1, wherein said step of monitoring transmissions over the end-to-end connection until transmissions cease for a preselected period of time is performed using a pause sensor.

3. The method of claim 2, wherein the sensitivity of said pause sensor is adjustable by varying a triggering time-delay of said pause sensor.

4. The method of claim 2, wherein said pause sensor is located within at least one of said other segments.

5. The method of claim 1, wherein said step of deactivating said first segment in response to the generation of the first signal is performed by issuing a pause command to a resource manager for the core telecommunications resources.

6. The method of claim 5, wherein said pause command controls the duration of dormancy of the dormant said other segments of said end-to-end connection.

7. The method of claim 1, wherein said step of deactivating said first segment in response to the generation of the first signal is conditioned upon a utilization rate for the core telecommunications resources being higher than a preset level.

8. The method of claim 1, wherein said step of deactivating said first segment in response to the generation of the first signal is conditioned upon an average utilization rate for the core telecommunications resources being higher than a preset level for a predetermined period of time.

9. The method of claim 1, wherein said step of deactivating said first segment in response to the generation of the first signal is adaptively correlated with a historical utilization rate of the core telecommunications resources for at least one of the group consisting of specific subscribers, specific datacom applications and specific times of day.

10. The method of claim 1, wherein, prior to said step of deactivating said first segment in response to the generation of the first signal, an active-to-dormant notification is sent to a plurality of devices associated with the end-to-end connection.

11. The method of claim 1, wherein, prior to said step of deactivating said first segment in response to the generation of the first signal, a prepare-for-pause warning is sent to a plurality of telecommunications devices associated with the end-to-end connection.

12. The method of claim 11, wherein, after the receipt of said prepare-for-pause warning by at least one of said telecommunications devices, a pause-acknowledgment response is sent from said at least one telecommunications device.

13. The method of claim 11, wherein, after receipt of said prepare-for-pause warning, at least one of said telecommunications devices save a plurality of state parameters associated with the end-to-end connection.

14. The method of claim 12, wherein said telecommunications devices comprise at least one of the group consisting of modems and adaptors.

15. The method of claim 1, wherein said step of deactivating said first segment in response to the generation of the first signal is performed in conjunction with a deactivation priority scheme.

16. The method of claim 15, wherein said telecommunications network has a multiplicity of subscribers, and wherein said deactivation priority scheme allocates different priorities to different subscribers.

17. The method of claim 15, wherein said telecommunications network employs a multiplicity of datacom application programs, and wherein said deactivation priority scheme allocates different priorities to different datacom application programs.

18. The method of claim 1, wherein said step of monitoring transmissions until transmissions continue in segments other than said first segment and generating the second signal in response thereto is performed using at least one wake-up sensor.

19. The method of claim 18, wherein said wake-up sensor is located within at least one of said other segments.

20. The method of claim 1, wherein said step of reactivating said first segment of said end-to-end connection in response to the generation of the second signal is performed by issuing a wake-up command to a resource manager for the core telecommunications resources.

21. The method of claim 1, wherein said step of reactivating said first segment of said end-to-end connection in response to the generation of the second signal is performed in conjunction with a reactivation priority scheme.

22. The method of claim 21, wherein said telecommunications network has a multiplicity of subscribers, and wherein said reactivation priority scheme allocates different priorities to different subscribers.

23. The method of claim 21, wherein said telecommunications network employs a multiplicity of datacom application programs, and wherein said reactivation priority scheme allocates different priorities to different datacom application programs.

24. The method of claim 1, wherein said step of reactivating said first segment of said end-to-end connection in response to the generation of the second signal comprises the step of queuing a reactivation request in at least one resource allocation queue if connection resources are unavailable for allocation at the time of reactivation of said dormant connection.

25. The method of claim 24, wherein a multiplicity of reactivation requests in said resource allocation queue are ordered by a priority class assigned to each said reactivation request.

26. The method of claim 1, wherein said telecommunications network has a multiplicity of subscribers, and wherein a given subscriber invoking the end-to-end connection pursuant to a connection service is subject to access controls.

27. The method of claim 1, further comprising, prior to said step of dividing the end-to-end connection into segments, storing a plurality of context information pertaining to said end-to-end connection.

28. The method of claim 27, wherein said step of reactivating said first segment of said end-to-end connection further comprises retrieving said stored context information.

29. The method of claim 1, further comprising, prior to said step of deactivating said first segment, storing a plurality of context information pertaining to the end-to-end connection.

30. The method of claim 29, wherein said step of reactivating said first segment of said end-to-end connection further comprises retrieving said stored context information.

31. The method of claim 1, wherein said datacom application program maintains an active connection between an origination point and a termination point for a given subscriber.

32. The method of claim 31, further comprising, prior to said step of dividing, checking a subscriber active status flag for a given subscriber and, if said flag is set, maintaining said end-to-end connection as an active connection.

33. The method of claim 1, wherein the time said other segments of said end-to-end connection is dormant for a given subscriber is measured.

34. The method of claim 33, wherein a subscription fee associated with said given subscriber is conditioned on the time said other segments of said end-to-end connection is dormant.

35. The method of claim 1, wherein said core telecommunications resources include a transmission component.

36. The method of claim 1, wherein said core telecommunications resources include a switching component.

37. The method of claim 1, wherein said end-to-end connection is an analog telephony connection.

38. The method of claim 1, wherein said end-to-end connection is a digital telephony connection.

39. The method of claim 1, wherein said end-to-end connection employs ISDN.

40. In a telecommunications network, a system for increasing the utilization efficiency of core telecommunications resources utilized by a datacom application program across an end-to-end connection, said system comprising:

means for dividing the end-to-end connection into at least two segments, including a first segment spanning the core telecommunications resources associated with the end-to-end connection;

means for monitoring transmissions over the end-to-end connection until transmissions cease for a preselected period of time and generating a first signal in response thereto, wherein said first signal is a cause command;

means for deactivating the first segment in response to the generation of the first signal and releasing the core telecommunications resources associated with the deactivated first segment for reuse by a telecommunications application, causing segments other than said first segment of said end-to-end connection to become dormant;

means for monitoring the transmission activity in said other segments of the end-to-end connection until transmissions continue in at least one of said other segments and generating a second signal in response thereto; and means for reactivating the first segment of said end-to-end connection in response to the generation of said second signal.

41. The system of claim 40, wherein said means for monitoring transmissions over the end-to-end connection until transmissions cease for a preselected period of time comprises a pause sensor.

42. The system of claim 41, wherein the sensitivity of said pause sensor is adjustable by varying a triggering time-delay of said pause sensor.

43. The system of claim 41, wherein said pause sensor is located within at least one of said other segments.

44. The system of claim 40, wherein said means for deactivating said first segment in response to the generation of the first signal comprises means for issuing a pause command to a resource manager for the core telecommunications resource.

45. The system of claim 44, wherein said means for issuing a pause command includes means for controlling the duration of dormancy of the dormant other segments of said end-to-end connection.

46. The system of claim 40, wherein said means for deactivating said first segment in response to the generation of the first signal deactivates said first segment if a utilization rate for the core telecommunications resources is higher than a preset level.

47. The system of claim 40, wherein said means for deactivating said first segment in response to the generation of said first signal deactivates said first segment if an average utilization rate for the core telecommunications resources is higher than a preset level for a predetermined period of time.

48. The system of claim 40, wherein said means for deactivating said first segment in response to the generation of said first signal is adaptively correlated with a historical utilization rate of the core telecommunications resources for at least one of the group consisting of specific subscribers, specific datacom applications and specific times of day.

49. The system of claim 40, wherein said means for deactivating said first segment in response to the generation of said first signal comprises means for issuing an active-to-dormant notification to a plurality of devices associated with the end-to-end connection.

50. The system of claim 40, wherein said means for deactivating said first segment in response to the generation of said first signal comprises means for issuing a prepare-for-pause warning to a plurality of telecommunications devices associated with the end-to-end connection.

51. The system of claim 50, wherein at least one of the telecommunications devices associated with the end-to-end connection includes means for generating a pause-acknowledgment signal in response to the receipt of the prepare-for-pause warning.

52. The system of claim 50, wherein, after receipt of said prepare-for-pause warning, at least one of said telecommunications devices saves a plurality of state parameters associated with the end-to-end connection.

53. The system of claim 52, wherein said telecommunications devices comprise at least one of the group consisting of modems and adaptors.

54. The system of claim 40, wherein said means for deactivating said first segment in response to the generation of said first signal is operative in conjunction with a deactivation priority scheme.

55. The system of claim 54, wherein said telecommunications network has a multiplicity of subscribers, and wherein said deactivation priority scheme allocates different priorities to different subscribers.

56. The system of claim 54, wherein said telecommunications network employs a multiplicity of datacom application programs, and wherein said deactivation priority scheme allocates different priorities to different datacom application programs.

57. The system of claim 40, wherein said means for monitoring transmissions until transmissions continue in segments other than said first segment and generating the second signal responsive thereto comprises at least one wake-up sensor means.

58. The system of claim 57, wherein said wake-up sensor means is located within at least one of said other segments.

59. The system of claim 40, wherein said means for reactivating said first segment of said end-to-end connection in response to the generation of the second signal comprises means for issuing a wake-up command to a resource manager for the core telecommunications resources.

60. The system of claim 40, wherein said means for reactivating said first segment of said end-to-end connection in response to the generation of the second signal is operative in conjunction with a reactivation priority scheme.

61. The system of claim 60, wherein said telecommunications network has a multiplicity of subscribers, and wherein said reactivation priority scheme allocates different priorities to different subscribers.

62. The system of claim 60, wherein said telecommunications network employs a multiplicity of datacom application programs, and wherein said reactivation priority scheme allocates different priorities to different datacom application programs.

63. The system of claim 40, wherein said means for reactivating said first segment of said end-to-end connection in response to the generation of the second signal comprises means for queuing a reactivation request in at least one resource allocation queue if connection resources are unavailable for allocation at the time of reactivation of said dormant connection.

64. The system of claim 63, wherein a multiplicity of reactivation requests in said resource allocation queue are ordered by a priority class assigned to each said reactivation request.

65. The system of claim 40, wherein said telecommunications network has a multiplicity of subscribers, and wherein a given subscriber invoking the end-to-end connection pursuant to a connection service is subject to access controls.

66. The system of claim 40, further comprising a memory for storing a plurality of context information pertaining to said end-to-end connection, said context information being stored within said memory prior to said dividing means dividing said end-to-end connection into said segments.

67. The system of claim 66, wherein said reactivating means retrieves said stored plurality of context information from said memory.

68. The system of claim 40, further comprising a memory for storing a plurality of context information pertaining to said end-to-end connection, said context information being stored within said memory prior to said deactivating means deactivating said first segment.

69. The system of claim 68, wherein said reactivating means retrieves said stored plurality of context information from said memory.

70. The system of claim 40, wherein said datacom application program maintains an active connection between an origination point and a termination point for a given subscriber.

71. The system of claim 70, further comprising a subscriber active status flag for a given subscriber, wherein, if said flag is set, said end-to-end connection is maintained as an active connection.

72. The system of claim 40, wherein the time said other segments of said end-to-end connection is dormant for a given subscriber is measured.

73. The system of claim 72, wherein a subscription fee associated with said given subscriber is conditioned on the time said other segments of said end-to-end connection is dormant.

74. The system of claim 40, wherein said core telecommunications resources include a transmission component.

75. The system of claim 40, wherein said core telecommunications resources include a switching component.

76. The system of claim 40, wherein said end-to-end connection is an analog telephony connection.

77. The system of claim 40, wherein said end-to-end connection is a digital telephony connection.

78. The system of claim 40, wherein said end-to-end connection employs ISDN.

79. In a telecommunications network, a method for increasing the utilization efficiency of shared components used across an end-to-end connection, the method comprising the steps of:

establishing the end-to-end connection using a datacom application program, said connection comprising a multiplicity of segments, a first of said segments including at least one shared component within the telecommunications network;

after establishment of the connection, storing a plurality of connection context information pertaining to the end-to-end connection within a memory;

monitoring data communications across the end-to-end connection and comparing the level of activity of said data communications therein against a communications threshold;

generating, after the data communications activity drops below said communications threshold, a first signal in response thereto;

deactivating the first segment, in response to the generation of the first signal, and releasing said at least one shared component for use by a telecommunications application;

resume monitoring data communications activity across at least one of the remaining of said multiplicity of segments;

generating, after said data communications activity across at least one of said remaining segments resumes, a second signal in response thereto; and reactivating the first segment, in response to the generation of the second signal, utilizing said plurality of stored connection context information.

80. The method according to claim 79, wherein said first signal is a pause signal.

81. The method according to claim 79, wherein said second signal is a wake-up signal.

82. The method according to claim 79, wherein said step of deactivating deactivates at least one other segment in response to said first signal, said at least one other segment including at least one other shared component.

83. The method according to claim 82, wherein said first signal deactivates said first and said at least one other segment using one of the group consisting of an inband signal and a control channel signal.

84. The method according to claim 79, wherein said step of deactivating the first segment is adaptive to the traffic load of the telecommunications network.

85. The method according to claim 79, wherein said at least one shared component comprises core telecommunications resources.

86. The method according to claim 85, wherein said at least one shared component comprises a transmission component.

87. The method according to claim 85, wherein said at least one shared component comprises a switching component.

88. The method according to claim 79, wherein said end-to-end connection is an analog telephony connection.

89. The method according to claim 79, wherein said end-to-end connection is a digital telephony connection.

90. The method according to claim 79, wherein said end-to-end connection employs ISDN.

91. In a telecommunication network, a system for increasing the utilization efficiency of shared components used across an end-to-end connection, the system comprising:

means for establishing the end-to-end connection using a datacom application program, said connection comprising a multiplicity of segments, a first of said segments including at least one shared component within the telecommunications network;

a memory for storing a plurality of connection context information pertaining to said end-to-end connection within said telecommunications network;

means for monitoring data communications across the end-to-end connection and comparing the level of activity of said data communications therein against a communications threshold;

means for generating, after the data communications activity drops below said communications threshold, a first signal in response thereto;

means for deactivating the first segment, in response to the generation of the first signal, and releasing said at least one shared component for use by a telecommunications application;

means for resume monitoring of data communications activity across at least one of the remaining of said multiplicity of segments;

means for generating, after said data communications activity across at least one of said segments resumes, a second signal in response thereto; and means for reactivating the first segment, in response to the generation of the second signal, utilizing said plurality of stored connection context information.

92. The system according to claim 91, wherein said first signal is a pause signal.

93. The system according to claim 91, wherein said second signal is a wake-up signal.

94. The system according to claim 91, wherein said deactivating means deactivates at least one other segment in response to said first signal, said at least one other segment including at least one other shared component.

95. The system according to claim 94, wherein said first signal deactivates said first and said at least one other segment using one of the group consisting of an inband signal and a control channel signal.

96. The system according to claim 91, wherein said deactivating means is adaptive to the traffic load of the telecommunications network.

97. The system according to claim 91, wherein said at least one shared component comprises core telecommunications resources.

98. The system according to claim 97, wherein said at least one shared component comprises a transmission component.

99. The system according to claim 97, wherein said al least one shared component comprises a switching component.

100. The system according to claim 91, wherein said end-to-end connection is an analog telephony connection.

101. The system according to claim 91, wherein said end-to-end connection is a digital telephony connection.

102. The system according to claim 91, wherein said end-to-end connection employs ISDN.

103. The method of claim 1, wherein at least one of said core telecommunications resources utilized by said datacom application program comprises a processing resource that lowers the processing load upon at least one other core telecommunications resource.

104. The method of claim 103, wherein said at least one other core telecommunications resource comprises said at least one other segment.

105. The system of claim 40, wherein at least one of said core telecommunications resources utilized by said datacom application program comprises a processing resource that lowers the processing load upon at least one other core telecommunications resource.

106. The system of claim 105, wherein said at least one other core telecommunication resource comprises said at least one other segment.

107. The method according to claim 79, wherein at least one of said shared components used across said end-to-end connection comprises a processing resource that lowers the processing load upon at least one other shared component.

108. The method of claim 107, wherein said at least one other shared component comprises said at least one of said remaining segment.

109. The system according to claim 91, wherein said at least one other shared component comprises said at least one of said remaining segments.

110. The system of claim 109, wherein said at least one other shared component comprises said at least one of said remaining segments.

* * * * *